United States Patent … Patent No.: US 12,438,752 B2
Lu et al.  Date of Patent: Oct. 7, 2025

(54) METHODS AND DEVICES FOR JOINT PROCESSING IN MASSIVE MIMO SYSTEMS

(71) Applicant: Intel Corporation, Santa Clara, CA (US)

(72) Inventors: Lu Lu, Hillsboro, OR (US); Sundar Krishnamurthy, Sunnyvale, CA (US); Kuilin Clark Chen, Portland, OR (US); Thushara Hewavithana, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 782 days.

(21) Appl. No.: 17/553,918

(22) Filed: Dec. 17, 2021

(65) Prior Publication Data
US 2023/0198815 A1  Jun. 22, 2023

(51) Int. Cl.
H04L 25/02 (2006.01)
H04B 17/391 (2015.01)

(52) U.S. Cl.
CPC ....... H04L 25/0256 (2013.01); H04B 17/391 (2015.01); H04L 25/025 (2013.01); H04L 25/0252 (2013.01); H04L 25/0258 (2013.01)

(58) Field of Classification Search
CPC ............... H04L 25/0256; H04L 25/025; H04L 25/0252; H04L 25/0258; H04L 25/03343; H04B 17/391
See application file for complete search history.

(56) References Cited

U.S. PATENT DOCUMENTS 10,158,454 B1 * 12/2018 Nammi ............... H04B 7/0639
10,333,672 B2 * 6/2019 Nagaraja ............. H04W 72/23
(Continued)

FOREIGN PATENT DOCUMENTS

CN 115516425 A * 12/2022 ......... G06F 9/45558
DE 102022130131 A1 * 6/2023 ......... H04L 25/0258
(Continued)

OTHER PUBLICATIONS

Y. Huang, C. Lu, M. Berg and P. Ödling, "Functional Split of Zero-Forcing Based Massive MIMO for Fronthaul Load Reduction," in IEEE Access, vol. 6, pp. 6350-6359, 2018, doi: 10.1109/Access.2017.2788451. (Year: 2018).*

Primary Examiner — Berhanu Tadese
(74) Attorney, Agent, or Firm — Viering, Jentschura & Partner mbB

(57) ABSTRACT

A distributed unit (DU) may include a transceiver configured to communicate with a plurality of radio units (RUs) that are configured to serve a plurality of user equipments (UEs). The DU may include a processor configured to determine RU precoding parameters for UEs served by a first RU set from the plurality of RUs based on estimated channel parameters for communication channels between the first RU set and at least one of interfering UEs served by other RUs from the plurality of RUs; to encode information indicating the determined precoding parameters for downlink transmissions to the first RU set and determine DU precoding parameters for downlink transmissions to the UEs served by the first RU set based on the determined RU precoding parameters; and/or precode communication signals based on the determined DU precoding parameters.

19 Claims, 9 Drawing Sheets

(56) References Cited

U.S. PATENT DOCUMENTS

| | | | | |
|---|---|---|---|---|
| 10,368,373 B2* | 7/2019 | Nagaraja | H04B 7/0811 |
| 10,461,822 B2* | 10/2019 | Liu | H04L 25/0222 |
| 10,505,597 B2* | 12/2019 | Soriaga | H04W 88/02 |
| 10,720,975 B2* | 7/2020 | Liu | H04L 1/0029 |
| 10,833,785 B1* | 11/2020 | O'Shea | H04L 27/0008 |
| 10,856,239 B2* | 12/2020 | Jeon | H04W 52/48 |
| 10,886,976 B2* | 1/2021 | Rajagopal | H04B 7/0848 |
| 10,904,843 B2* | 1/2021 | Chakraborty | H04W 52/146 |
| 11,018,745 B2* | 5/2021 | Zhang | H04B 7/0626 |
| 11,043,994 B2* | 6/2021 | Liu | H04L 5/003 |
| 11,088,744 B1* | 8/2021 | Hammond | H04W 56/001 |
| 11,159,982 B2* | 10/2021 | Rajagopal | H04B 7/0456 |
| 11,184,208 B2* | 11/2021 | Ren | H04B 17/309 |
| 11,219,062 B2* | 1/2022 | Jeon | H04L 5/0051 |
| 11,246,105 B2* | 2/2022 | Chakraborty | H04W 52/146 |
| 11,259,331 B2* | 2/2022 | Jeon | H04W 56/005 |
| 11,290,169 B2* | 3/2022 | Trojer | H04B 7/0456 |
| 11,290,228 B2* | 3/2022 | Nagaraja | H04W 72/23 |
| 11,303,333 B2* | 4/2022 | Piirainen | H04B 7/024 |
| 11,323,968 B2* | 5/2022 | Liu | H04W 52/14 |
| 11,336,399 B2* | 5/2022 | Levy | H04L 1/1896 |
| 11,362,707 B2* | 6/2022 | Jin | H04B 7/0456 |
| 11,363,540 B2* | 6/2022 | Jeon | H04W 52/48 |
| 11,381,288 B2* | 7/2022 | Liu | H04L 25/0222 |
| 11,387,881 B2* | 7/2022 | Cheraghi | H04B 7/0626 |
| 11,399,303 B2* | 7/2022 | Bedekar | H04W 8/24 |
| 11,411,623 B2* | 8/2022 | Yin | H04B 7/0456 |
| 11,419,105 B2* | 8/2022 | Lu | H04B 7/0452 |
| 11,438,044 B1* | 9/2022 | Piirainen | H04B 7/0413 |
| 11,456,786 B2* | 9/2022 | Wang | H04B 7/0478 |
| 11,456,833 B2* | 9/2022 | Moon | H04L 27/2628 |
| 11,489,568 B2* | 11/2022 | Kuchi | H04B 7/0626 |
| 11,496,201 B2* | 11/2022 | Tsui | H04W 72/0473 |
| 11,523,396 B2* | 12/2022 | Tsui | H04L 41/16 |
| 11,532,882 B2* | 12/2022 | Tsui | H04W 72/569 |
| 11,533,199 B2* | 12/2022 | Tsui | H04B 7/088 |
| 11,546,041 B2* | 1/2023 | El-Keyi | H04B 7/0695 |
| 11,573,286 B1* | 2/2023 | Bao | G01S 5/0205 |
| 11,581,925 B2* | 2/2023 | Jin | H04L 1/0028 |
| 11,581,965 B2* | 2/2023 | O'Shea | H04L 27/0008 |
| 11,582,070 B2* | 2/2023 | Tsui | H04L 25/0226 |
| 11,611,456 B2* | 3/2023 | Tsui | H04W 72/569 |
| 11,689,256 B2* | 6/2023 | Zhong | H04L 5/0048 375/267 |
| 11,716,184 B2* | 8/2023 | Zhang | H04B 7/0626 370/329 |
| 11,722,968 B2* | 8/2023 | Liu | H04W 52/14 455/522 |
| 11,729,654 B2* | 8/2023 | Bachu | H04W 24/10 370/329 |
| 11,737,149 B2* | 8/2023 | Jeon | H04W 74/006 370/329 |
| 11,770,286 B2* | 9/2023 | Timo | H04L 25/0254 375/262 |
| 11,784,853 B2* | 10/2023 | Jin | H04B 7/0421 370/252 |
| 11,791,871 B2* | 10/2023 | Banuli Nanje Gowda | H04B 7/0456 375/267 |
| 11,791,938 B2* | 10/2023 | Podlozhnyuk | H03M 13/1137 370/328 |
| 11,811,471 B2* | 11/2023 | Zhong | H04L 25/0202 |
| 11,812,302 B2* | 11/2023 | Rajagopal | H04L 25/0256 |
| 11,824,626 B2* | 11/2023 | Moon | H04L 5/0048 |
| 11,838,126 B2* | 12/2023 | Papadopoulou | H03M 13/611 |
| 11,843,480 B2* | 12/2023 | Tsui | H04L 25/0226 |
| 11,848,729 B2* | 12/2023 | Wang | H04L 5/0003 |
| 11,863,262 B2* | 1/2024 | Jin | H04B 7/063 |
| 11,876,585 B1* | 1/2024 | Bachu | H04B 7/0456 |
| 11,924,009 B1* | 3/2024 | Shaked | H04L 5/0098 |
| 11,943,014 B2* | 3/2024 | Yin | H04B 7/0639 |
| 11,949,475 B2* | 4/2024 | Kuchi | H04B 7/0639 |
| 11,956,006 B2* | 4/2024 | Meir | H04B 7/0456 |
| 11,962,438 B2* | 4/2024 | Tsui | H04B 7/0417 |
| 11,968,020 B2* | 4/2024 | Hu | H04B 7/0854 |
| 11,996,958 B2* | 5/2024 | Tsui | H04L 43/0852 |
| 11,997,606 B2* | 5/2024 | Zhou | H04L 5/0096 |
| 12,004,025 B2* | 6/2024 | Gundavelli | H04W 36/00835 |
| 12,009,957 B2* | 6/2024 | Abdelghaffar | H04J 13/0074 |
| 12,010,571 B2* | 6/2024 | Popescu | H04W 24/10 |
| 12,010,619 B2* | 6/2024 | Zhou | H04W 24/02 |
| 12,010,634 B2* | 6/2024 | Jeon | H04W 74/0866 |
| 12,021,660 B2* | 6/2024 | Tsui | H04B 17/309 |
| 12,047,142 B2* | 7/2024 | Huang | H04B 7/063 |
| 12,052,074 B2* | 7/2024 | Ly | H04L 5/0017 |
| 12,074,673 B2* | 8/2024 | Ly | H04B 7/0623 |
| 12,081,301 B2* | 9/2024 | Jiang | H04B 7/0645 |
| 12,081,478 B2* | 9/2024 | Zhang | H04B 7/0626 |
| 12,081,482 B1* | 9/2024 | Ibrahim | H04L 5/0051 |
| 12,082,247 B2* | 9/2024 | Jeon | H04W 74/0833 |
| 12,088,379 B2* | 9/2024 | Wu | H04L 5/0051 |
| 12,088,384 B2* | 9/2024 | Jin | H04B 7/0626 |
| 12,089,220 B2* | 9/2024 | Zhou | H04W 52/0206 |
| 12,089,292 B2* | 9/2024 | Zhang | H04L 61/5007 |
| 12,095,685 B2* | 9/2024 | Patchava | H04L 27/2639 |
| 12,143,178 B2* | 11/2024 | Kuchi | H04B 7/0452 |
| 12,143,246 B2* | 11/2024 | Huang | H04L 25/0242 |
| 12,156,147 B2* | 11/2024 | Liu | H04W 52/325 |
| 12,166,555 B2* | 12/2024 | Schreck | H04B 7/0617 |
| 12,184,363 B2* | 12/2024 | Lu | H04W 72/541 |
| 12,212,387 B2* | 1/2025 | Xu | H04L 27/26025 |
| 12,213,084 B2* | 1/2025 | Abotabl | H04W 52/325 |
| 2019/0289497 A1 | 9/2019 | Rajagopal | H04B 7/0456 |
| 2021/0119848 A1* | 4/2021 | Ibars Casas | H04L 1/0052 |
| 2021/0135733 A1* | 5/2021 | Huang | H04B 7/0691 |
| 2021/0152282 A1* | 5/2021 | Huang | H04L 1/0061 |
| 2021/0184795 A1* | 6/2021 | Ibars Casas | H04W 88/08 |
| 2021/0250076 A1* | 8/2021 | Jin | H04B 7/0626 |
| 2021/0279055 A1* | 9/2021 | Saxena | G06F 9/30038 |
| 2021/0314122 A1* | 10/2021 | Jin | H04L 5/005 |
| 2021/0320825 A1* | 10/2021 | Banuli Nanje Gowda | H04L 25/03159 |
| 2021/0337565 A1* | 10/2021 | Wang | H04W 72/046 |
| 2021/0385686 A1* | 12/2021 | Ahmed | H04W 28/06 |
| 2021/0390004 A1* | 12/2021 | Kundu | G06F 9/545 |
| 2021/0410007 A1* | 12/2021 | Rajagopal | H04B 7/0456 |
| 2022/0021423 A1* | 1/2022 | Ahmed | H04L 5/0051 |
| 2022/0151022 A1* | 5/2022 | Chikkur Dattatraya | H04L 69/323 |
| 2022/0159637 A1* | 5/2022 | Kundu | H04B 7/0413 |
| 2022/0231701 A1* | 7/2022 | Furtek | H03M 13/616 |
| 2022/0255596 A1* | 8/2022 | Lu | H04B 7/0413 |
| 2022/0256315 A1* | 8/2022 | Lei | H04W 72/1263 |
| 2022/0263560 A1* | 8/2022 | Cai | H04B 7/0617 |
| 2022/0263691 A1* | 8/2022 | Furtek | H04L 25/067 |
| 2022/0271900 A1* | 8/2022 | Liu | H04L 5/0078 |
| 2022/0276914 A1* | 9/2022 | Kundu | G06F 9/4881 |
| 2022/0278713 A1* | 9/2022 | Tsui | H04L 5/0048 |
| 2022/0278717 A1* | 9/2022 | Tsui | H04L 43/16 |
| 2022/0278875 A1* | 9/2022 | Tsui | H04L 43/06 |
| 2022/0279520 A1* | 9/2022 | Tsui | H04B 7/0469 |
| 2022/0279535 A1* | 9/2022 | Tsui | H04L 25/0222 |
| 2022/0287062 A1* | 9/2022 | Huang | H04L 5/0044 |
| 2022/0321197 A1* | 10/2022 | Davydov | H04B 7/0854 |
| 2022/0329289 A1* | 10/2022 | Huang | H04B 7/024 |
| 2022/0353725 A1* | 11/2022 | Jin | H04W 24/10 |
| 2022/0386322 A1* | 12/2022 | Choe | H04L 1/0009 |
| 2022/0413928 A1* | 12/2022 | Banuli Nanje Gowda | H04W 28/16 |
| 2023/0013510 A1* | 1/2023 | Ge | H04L 5/0094 |
| 2023/0029375 A1* | 1/2023 | Tsui | G06N 20/00 |
| 2023/0038585 A1* | 2/2023 | Tsui | H04L 25/0226 |
| 2023/0044335 A1* | 2/2023 | Tsui | H04B 7/0645 |
| 2023/0050488 A1* | 2/2023 | Tsui | H04W 72/23 |
| 2023/0070361 A1* | 3/2023 | Papadopoulou | H03M 13/6561 |
| 2023/0078276 A1* | 3/2023 | Muralidhar | H04L 25/0228 370/267 |
| 2023/0098229 A1* | 3/2023 | Gurelli | G01S 5/10 455/456.1 |
| 2023/0113557 A1* | 4/2023 | Yoo | H04B 7/0626 370/252 |
| 2023/0133992 A1* | 5/2023 | Ganju | H04B 17/27 370/252 |

(56) References Cited

U.S. PATENT DOCUMENTS

| | | | |
|---|---|---|---|
| 2023/0163824 A1* | 5/2023 | Song | H04L 5/0057 375/267 |
| 2023/0164003 A1* | 5/2023 | Tsui | H04L 41/16 455/522 |
| 2023/0170956 A1* | 6/2023 | Elshafie | H04B 7/10 370/255 |
| 2023/0198815 A1* | 6/2023 | Lu | H04L 25/0258 375/262 |
| 2023/0205606 A1* | 6/2023 | Palermo | G06F 9/5072 718/104 |
| 2023/0209549 A1* | 6/2023 | Amuru | H04L 5/0094 370/329 |
| 2023/0216552 A1* | 7/2023 | Jeon | H04B 7/0874 375/262 |
| 2023/0217253 A1* | 7/2023 | Palermo | G06F 9/505 726/23 |
| 2023/0224118 A1* | 7/2023 | Lim | H04L 5/0094 370/329 |
| 2023/0231686 A1* | 7/2023 | Jeon | H04L 5/0091 370/329 |
| 2023/0254196 A1* | 8/2023 | Shim | H04B 17/345 370/329 |
| 2023/0262474 A1* | 8/2023 | Shim | H04W 72/04 370/329 |
| 2023/0275784 A1* | 8/2023 | Sayed Hassan | H04B 7/0617 370/252 |
| 2023/0276368 A1* | 8/2023 | Mahmood | H04W 52/143 |
| 2023/0276450 A1* | 8/2023 | Abdelghaffar | H04L 5/0048 370/329 |
| 2023/0281053 A1* | 9/2023 | Kundu | H04L 69/321 718/105 |
| 2023/0283328 A1* | 9/2023 | Sayed Hassan | H04B 7/0456 370/328 |
| 2023/0283348 A1* | 9/2023 | MolavianJazi | H04B 7/0695 |
| 2023/0283691 A1* | 9/2023 | Kundu | H04L 67/63 455/414.1 |
| 2023/0284074 A1* | 9/2023 | Kundu | G06F 9/5044 370/329 |
| 2023/0284139 A1* | 9/2023 | Ma | H04B 7/0626 370/329 |
| 2023/0284178 A1* | 9/2023 | Parker | G01S 5/01 455/456.1 |
| 2023/0284185 A1* | 9/2023 | Kundu | H04L 41/0896 370/329 |
| 2023/0297449 A1* | 9/2023 | Kundu | G06F 9/544 |
| 2023/0297450 A1* | 9/2023 | Kundu | H04L 67/2866 |
| 2023/0297451 A1* | 9/2023 | Kundu | H04W 72/51 |
| 2023/0297452 A1* | 9/2023 | Kundu | H04W 48/18 |
| 2023/0299862 A1* | 9/2023 | O'Shea | G06N 3/045 370/252 |
| 2023/0300728 A1* | 9/2023 | Kundu | G06F 9/545 |
| 2023/0308149 A1* | 9/2023 | Yun | H04B 7/0695 |
| 2023/0318677 A1* | 10/2023 | Wang | H04L 5/0048 375/267 |
| 2023/0328736 A1* | 10/2023 | Choi | H04L 25/03343 370/330 |
| 2023/0345386 A1* | 10/2023 | Abotabl | H04W 52/143 |
| 2023/0359872 A1* | 11/2023 | Lin | G06N 3/0455 |
| 2023/0361836 A1* | 11/2023 | Yuan | H04B 7/0617 |
| 2023/0370137 A1* | 11/2023 | Ly | H04L 5/0051 |
| 2023/0413075 A1* | 12/2023 | Duan | H04W 52/16 |
| 2023/0421320 A1* | 12/2023 | Levitsky | H04L 27/01 |
| 2024/0007160 A1* | 1/2024 | Xu | H01Q 3/40 |
| 2024/0007253 A1* | 1/2024 | Abotabl | H04L 5/0057 |
| 2024/0007881 A1* | 1/2024 | Gutman | H04B 7/15 |
| 2024/0014869 A1* | 1/2024 | Ly | H04B 7/0456 |
| 2024/0014963 A1* | 1/2024 | Delfeld | H04L 5/0048 |
| 2024/0014987 A1* | 1/2024 | Delfeld | H04L 5/0048 |
| 2024/0014991 A1* | 1/2024 | Paz | H04L 5/0094 |
| 2024/0015739 A1* | 1/2024 | Ly | H04L 1/08 |
| 2024/0022927 A1* | 1/2024 | Tong | H04W 4/40 |
| 2024/0030978 A1* | 1/2024 | Ly | H04B 7/0482 |
| 2024/0039599 A1* | 2/2024 | Abotabl | H04B 7/0626 |
| 2024/0049197 A1* | 2/2024 | MolavianJazi | H04B 7/15528 |
| 2024/0049272 A1* | 2/2024 | Orhan | G06N 3/042 |
| 2024/0056139 A1* | 2/2024 | Ge | H04B 7/0456 |
| 2024/0056159 A1* | 2/2024 | Hewavithana | H04B 7/0452 |
| 2024/0056248 A1* | 2/2024 | Duan | H04W 72/0446 |
| 2024/0056856 A1* | 2/2024 | Lin | H04W 24/10 |
| 2024/0063962 A1* | 2/2024 | Lin | H04L 5/0094 |
| 2024/0064044 A1* | 2/2024 | Liu | H04L 25/024 |
| 2024/0072858 A1* | 2/2024 | Wang | H04B 7/0626 |
| 2024/0080740 A1* | 3/2024 | Yerramalli | H04W 76/20 |
| 2024/0080795 A1* | 3/2024 | Zorgui | H04L 5/0094 |
| 2024/0089975 A1* | 3/2024 | Ly | H04W 72/1268 |
| 2024/0095536 A1* | 3/2024 | Lin | G06N 3/084 |
| 2024/0097774 A1* | 3/2024 | Lin | H04B 7/0857 |
| 2024/0097843 A1* | 3/2024 | Lin | H04L 5/0091 |
| 2024/0098470 A1* | 3/2024 | Kundu | G06T 1/20 |
| 2024/0107356 A1* | 3/2024 | Yerramalli | H04W 24/10 |
| 2024/0107443 A1* | 3/2024 | Singh | H04B 7/08 |
| 2024/0113919 A1* | 4/2024 | Pratik | G06N 3/0455 |
| 2024/0118951 A1* | 4/2024 | Boccuzzi | H04L 41/5058 |
| 2024/0118952 A1* | 4/2024 | Boccuzzi | H04L 41/12 |
| 2024/0118953 A1* | 4/2024 | Boccuzzi | H04W 24/10 |
| 2024/0118954 A1* | 4/2024 | Boccuzzi | G06F 9/547 |
| 2024/0118955 A1* | 4/2024 | Boccuzzi | H04L 41/0803 |
| 2024/0121160 A1* | 4/2024 | Boccuzzi | H04L 41/14 |
| 2024/0121314 A1* | 4/2024 | Boccuzzi | H04L 41/12 |
| 2024/0121315 A1* | 4/2024 | Boccuzzi | H04L 41/12 |
| 2024/0121598 A1* | 4/2024 | Boccuzzi | H04L 67/133 |
| 2024/0121599 A1* | 4/2024 | Boccuzzi | H04L 41/5058 |
| 2024/0121630 A1* | 4/2024 | Boccuzzi | H04L 41/12 |
| 2024/0121631 A1* | 4/2024 | Boccuzzi | H04W 28/0215 |
| 2024/0121646 A1* | 4/2024 | Elshafie | H04W 24/10 |
| 2024/0121753 A1* | 4/2024 | Bao | H04W 64/006 |
| 2024/0129751 A1* | 4/2024 | Belgiovine | H04W 16/28 |
| 2024/0137256 A1* | 4/2024 | Duan | H04L 27/26134 |
| 2024/0137259 A1* | 4/2024 | Regev | H04L 27/2657 |
| 2024/0154658 A1* | 5/2024 | Chandwani | H04L 5/0051 |
| 2024/0154660 A1* | 5/2024 | Lu | H04B 7/024 |
| 2024/0154675 A1* | 5/2024 | Shi | H04B 7/0626 |
| 2024/0162955 A1* | 5/2024 | Whinnett | H04W 24/10 |
| 2024/0163850 A1* | 5/2024 | Elshafie | H04W 72/044 |
| 2024/0171241 A1* | 5/2024 | Lu | H04B 7/0456 |
| 2024/0172159 A1* | 5/2024 | Martin | H04W 56/005 |
| 2024/0179031 A1* | 5/2024 | Delfeld | H04B 7/0617 |
| 2024/0193019 A1* | 6/2024 | Wu | G06F 9/544 |
| 2024/0193020 A1* | 6/2024 | Wu | H04W 28/14 |
| 2024/0195473 A1* | 6/2024 | Lu | H04B 7/0617 |
| 2024/0195871 A1* | 6/2024 | Wu | G06F 12/023 |
| 2024/0196183 A1* | 6/2024 | Wu | H04W 76/30 |
| 2024/0201731 A1* | 6/2024 | Boccuzzi | G06F 9/547 |
| 2024/0205295 A1* | 6/2024 | Boccuzzi | G06F 9/545 |
| 2024/0205312 A1* | 6/2024 | Boccuzzi | H04L 69/28 |
| 2024/0205740 A1* | 6/2024 | Boccuzzi | G06F 9/547 |
| 2024/0205749 A1* | 6/2024 | Boccuzzi | H04W 28/16 |
| 2024/0205805 A1* | 6/2024 | Boccuzzi | H04W 48/18 |
| 2024/0214833 A1* | 6/2024 | Forenza | H04W 28/0858 |
| 2024/0214847 A1* | 6/2024 | Elshafie | H04W 24/10 |
| 2024/0214931 A1* | 6/2024 | Huang | H04W 52/0229 |
| 2024/0219510 A1* | 7/2024 | Bayesteh | G01S 5/02529 |
| 2024/0223307 A1* | 7/2024 | Papadopoulou | H04L 1/0061 |
| 2024/0223344 A1* | 7/2024 | Huang | H04L 5/0073 |
| 2024/0223406 A1* | 7/2024 | Tsui | H04L 5/0073 |
| 2024/0224090 A1* | 7/2024 | Regev | H04W 24/08 |
| 2024/0250723 A1* | 7/2024 | Mo | H04B 7/0626 |
| 2024/0259061 A1* | 8/2024 | Abotabl | H04L 1/0026 |
| 2024/0259834 A1* | 8/2024 | Abu Al Haija | H04W 8/005 |
| 2024/0275045 A1* | 8/2024 | Paz | H04B 7/06952 |
| 2024/0275440 A1* | 8/2024 | Xi | H04B 7/0482 |
| 2024/0275464 A1* | 8/2024 | Li | H04B 7/0695 |
| 2024/0275465 A1* | 8/2024 | Li | H04B 7/0695 |
| 2024/0283513 A1* | 8/2024 | Bi | H04B 7/063 |
| 2024/0291526 A1* | 8/2024 | Mahmood | H04B 7/0617 |
| 2024/0291550 A1* | 8/2024 | Zhang | H04B 7/0413 |
| 2024/0291691 A1* | 8/2024 | Tsui | H04W 84/04 |
| 2024/0297809 A1* | 9/2024 | Furtek | H04L 25/067 |
| 2024/0297810 A1* | 9/2024 | Furtek | H04L 25/03171 |
| 2024/0306000 A1* | 9/2024 | Balevi | H04L 1/0009 |
| 2024/0313836 A1* | 9/2024 | Medra | H04W 8/22 |
| 2024/0314693 A1* | 9/2024 | Zhou | H04W 52/0235 |

(56) References Cited

U.S. PATENT DOCUMENTS

| | | | |
|---|---|---|---|
| 2024/0322865 A1* | 9/2024 | Davydov | H04L 5/0053 |
| 2024/0322868 A1* | 9/2024 | Mahmood | H04B 7/0452 |
| 2024/0322875 A1* | 9/2024 | Farmanbar | H04B 7/0617 |
| 2024/0322969 A1* | 9/2024 | Davydov | H04L 5/0023 |
| 2024/0340048 A1* | 10/2024 | Luo | H04B 7/0626 |
| 2024/0340050 A1* | 10/2024 | Airoldi | H04W 88/085 |
| 2024/0348283 A1* | 10/2024 | Schmitz | H04B 1/7093 |
| 2024/0348296 A1* | 10/2024 | Wang | H04B 1/40 |
| 2024/0348478 A1* | 10/2024 | Chen | H04L 25/0204 |
| 2024/0356603 A1* | 10/2024 | Kovalchukov | H04B 7/0626 |
| 2024/0357364 A1* | 10/2024 | Montalvo | H04W 28/0925 |
| 2024/0357376 A1* | 10/2024 | Luo | H04W 16/28 |
| 2024/0365137 A1* | 10/2024 | Wang | G06N 3/0442 |
| 2024/0370436 A1* | 11/2024 | Kundu | G06F 16/24542 |
| 2024/0372600 A1* | 11/2024 | Schreck | H04B 7/0456 |
| 2024/0388923 A1* | 11/2024 | Montalvo | H04W 28/0925 |
| 2024/0396603 A1* | 11/2024 | Huang | H04B 7/0617 |
| 2024/0405834 A1* | 12/2024 | Jin | H04B 7/0639 |
| 2024/0406702 A1* | 12/2024 | Kumari | H04W 24/10 |
| 2024/0406743 A1* | 12/2024 | Montalvo | H04W 16/10 |
| 2024/0406744 A1* | 12/2024 | Montalvo | H04B 17/27 |
| 2024/0407034 A1* | 12/2024 | Elshafie | H04W 76/20 |
| 2024/0413858 A1* | 12/2024 | McMenamy | H04W 24/10 |
| 2024/0414547 A1* | 12/2024 | Montalvo | H04W 24/08 |
| 2024/0414548 A1* | 12/2024 | Montalvo | H04B 17/373 |
| 2024/0421867 A1* | 12/2024 | Huang | H04B 7/0663 |
| 2024/0422555 A1* | 12/2024 | Montalvo | H04W 28/0942 |
| 2024/0422696 A1* | 12/2024 | Wang | H04W 52/42 |
| 2024/0430688 A1* | 12/2024 | Montalvo | H04W 72/0453 |
| 2024/0430689 A1* | 12/2024 | Montalvo | H04W 16/10 |
| 2024/0430741 A1* | 12/2024 | Uchino | H04W 80/02 |
| 2024/0430892 A1* | 12/2024 | Amuru | H04W 28/02 |
| 2024/0430893 A1* | 12/2024 | Amuru | H04L 5/0053 |
| 2025/0015856 A1* | 1/2025 | Ly | H04B 7/0608 |
| 2025/0021411 A1* | 1/2025 | Kundu | G06F 9/547 |
| 2025/0021412 A1* | 1/2025 | Kundu | H04W 24/02 |
| 2025/0039024 A1* | 1/2025 | Abdelghaffar | H04L 5/0012 |

FOREIGN PATENT DOCUMENTS

| | | | | |
|---|---|---|---|---|
| EP | 3955470 A2 * | 2/2022 | | H04W 72/21 |
| EP | 3900481 B1 * | 7/2023 | | H04W 88/085 |
| EP | 3955470 B1 * | 5/2024 | | H04B 7/0617 |
| EP | 3732794 B1 * | 7/2024 | | H04W 72/541 |
| JP | 2024527214 A * | 7/2024 | | H04B 7/0632 |
| KR | 20220101473 A * | 7/2022 | | H04W 72/0446 |
| KR | 20230015895 A * | 1/2023 | | H04L 67/10 |
| KR | 20240000319 A * | 1/2024 | | H04B 17/373 |
| KR | 20240094949 A * | 6/2024 | | H04L 25/024 |
| KR | 20240099972 A * | 7/2024 | | H04L 5/0051 |
| KR | 20240115134 A * | 7/2024 | | H04L 25/03299 |
| KR | 20240116316 A * | 7/2024 | | H04L 27/01 |
| RU | 2817678 C1 * | 4/2024 | | |
| WO | WO-2019132743 A1 * | 7/2019 | | H04W 72/541 |
| WO | WO-2019183020 A1 * | 9/2019 | | H04B 7/0456 |
| WO | WO-2020130895 A1 * | 6/2020 | | H04B 1/40 |
| WO | WO-2020242352 A1 * | 12/2020 | | H04L 5/0048 |
| WO | WO-2020256609 A1 * | 12/2020 | | H04W 72/541 |
| WO | WO-2021242388 A1 * | 12/2021 | | G06F 9/5044 |
| WO | WO-2021242389 A1 * | 12/2021 | | G06F 9/45558 |
| WO | WO-2022265713 A1 * | 12/2022 | | H04W 24/02 |
| WO | WO-2023003969 A1 * | 1/2023 | | H04L 5/0007 |
| WO | WO-2023287808 A1 * | 1/2023 | | H04B 7/0617 |
| WO | WO-2023033691 A1 * | 3/2023 | | H04B 7/0854 |
| WO | WO-2023136838 A1 * | 7/2023 | | H04B 7/086 |
| WO | WO-2023249356 A1 * | 12/2023 | | H04L 5/005 |
| WO | WO-2024011129 A1 * | 1/2024 | | H04L 5/0048 |
| WO | WO-2024064354 A1 * | 3/2024 | | H04L 25/0254 |
| WO | WO-2024128624 A1 * | 6/2024 | | H04L 5/00 |
| WO | WO-2024136141 A1 * | 6/2024 | | H04L 5/0051 |
| WO | WO-2024154969 A1 * | 7/2024 | | H04L 25/02 |
| WO | WO-2024154974 A1 * | 7/2024 | | H04L 27/01 |
| WO | WO-2024220019 A1 * | 10/2024 | | H04B 7/0456 |

* cited by examiner $v_1 \in \text{null}([H_{13} \quad H_{33}])$ $v_2 \in \text{null}([H_{21} \quad H_{23}])$ $v_3 \in \text{null}([H_{31} \quad H_{32}])$ $$\begin{vmatrix} V_1 H_{11} & 0 & 0 \\ 0 & V_2 H_{22} & 0 \\ 0 & 0 & V_3 H_{33} \end{vmatrix} \times \begin{vmatrix} X_1 \\ X_2 \\ X_3 \end{vmatrix} = \begin{vmatrix} Y_1 \\ Y_2 \\ Y_3 \end{vmatrix}$$

48 x 24 matrix     24x1 TX symbols    48x1 RX signal

FIG. 8

$$\begin{vmatrix} V_1H_{11} & 0 & 0 & V_1H_{14} & V_1H_{15} & V_1H_{16} & V_1H_{17} \\ V_2H_{21} & V_2H_{22} & 0 & 0 & V_2H_{25} & V_2H_{26} & V_2H_{27} \\ V_3H_{31} & V_3H_{32} & V_3H_{33} & 0 & 0 & V_3H_{36} & V_3H_{37} \\ V_4H_{41} & V_4H_{42} & V_4H_{43} & V_4H_{44} & 0 & 0 & V_4H_{47} \\ V_5H_{51} & V_5H_{52} & V_5H_{53} & V_5H_{54} & V_5H_{55} & 0 & 0 \\ 0 & V_6H_{62} & V_6H_{63} & V_6H_{64} & V_6H_{65} & V_6H_{66} & 0 \\ 0 & 0 & V_7H_{73} & V_7H_{74} & V_7H_{75} & V_7H_{76} & V_7H_{77} \end{vmatrix} \times \begin{vmatrix} X_1 \\ X_2 \\ X_3 \\ X_4 \\ X_5 \\ X_6 \\ X_7 \end{vmatrix} = \begin{vmatrix} Y_1 \\ Y_2 \\ Y_3 \\ Y_4 \\ Y_5 \\ Y_6 \\ Y_7 \end{vmatrix}$$

112 × 56 matrix     56×1 TX symbols     112×1 RX signal

METHODS AND DEVICES FOR JOINT PROCESSING IN MASSIVE MIMO SYSTEMS

TECHNICAL FIELD

This disclosure generally relates to methods and devices for joint processing in massive MIMO systems.

BACKGROUND

Traditional radio access networks (RANs) employed integrated systems in which the entire processing with respect to transmission and reception of radio communication signals was performed. In such traditional RANs, network access nodes may implement the whole network stack including physical layer (PHY), media access control (MAC), radio link control (RLC), and packet data convergence control (PDCP).

In various deployments in recently emerged RAN architectures, such as Open Radio Access Network (O-RAN) architectures, network access nodes may have functionalities that are split among multiple units with an intention to meet the demands of increased capacity requirements by providing a flexible and interoperable approach for RANs. There are many approaches to provide the split among the multiple units. In one example, a baseband unit (BBU) that may operate in the cloud and may be split to a Control Unit (CU) (e.g. O-CU) mainly responsible for non-real time operations hosting the radio resource control (RRC) and the control plane of the PDCP protocol and a Distributed Unit (DU) (e.g. O-DU) mainly responsible for real-time operations hosting, for example, RLC layer functions, MAC layer functions, and Higher-PHY functions. Radio units (RUs) (e.g. O-RU) hosting the Lower-PHY functions may receive radio communication signals from terminal devices and provide data streams to the DU over a fronthaul interface (e.g. open fronthaul). In this context, each O-RU and O-DU may be coupled with one-to-one mapping. In systems such as Co-ordinated Multipoint (COMP), Cell-free Massive MIMO, Distributed Antenna Systems and Network MIMO, improvements in terms of capacity may be obtained by each O-DU performing joint processing of the signals received from multiple O-RU.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 8 exemplarily shows an illustration of a matrix that a DU may process;

DESCRIPTION

Figure 1:
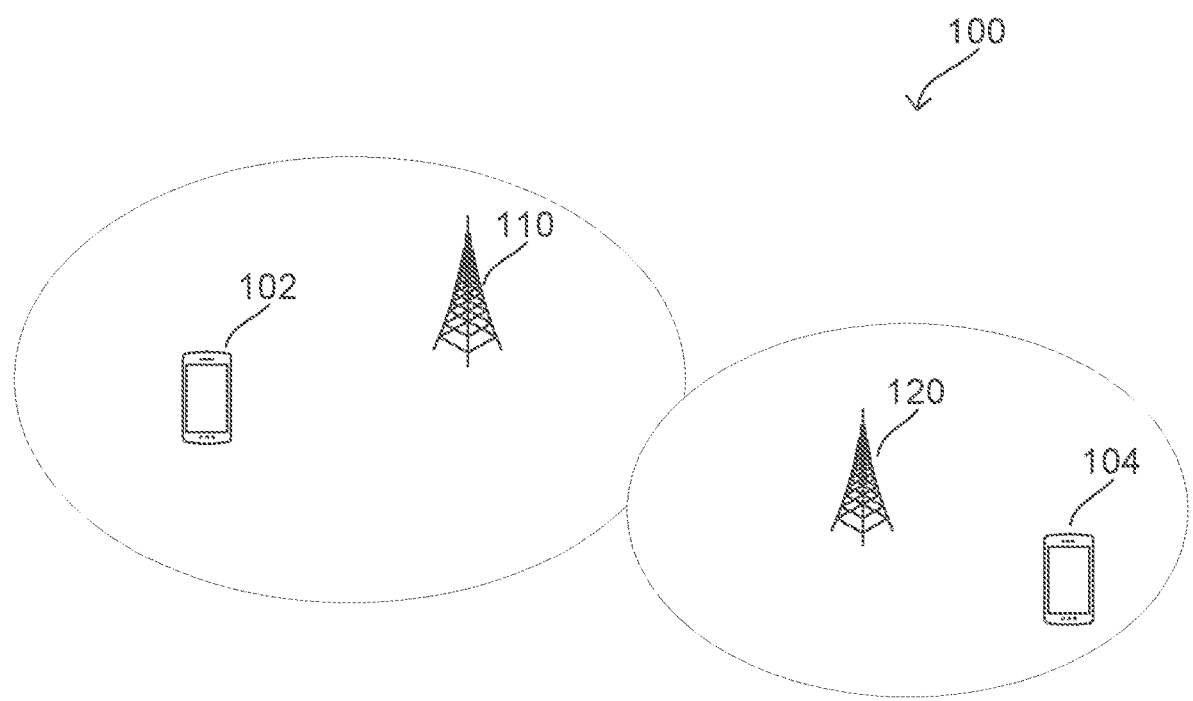
FIG. 1 shows exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

An antenna port may be understood as a logical concept representing a specific channel or associated with a specific channel. An antenna port may be understood as a logical structure associated with a respective channel (e.g., a respective channel between a user equipment and a base station). Illustratively, symbols (e.g., OFDM symbols) transmitted over an antenna port (e.g., over a first channel) may be subject to different propagation conditions with respect to other symbols transmitted over another antenna port (e.g., over a second channel).

FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include NR, LTE, UMTS, GSM, WiMAX, Bluetooth, WiFi, mmWave, etc., any of which may be applicable to radio communication network 100.

In various aspects, network access nodes 110 and 120 may include one or more CUs, one or more DU, and one or more RUs to communicate with terminal devices 102 and 104. In various examples, an RU may include a device configured to implement various processing functions for RF. In particular the RU may implement functions of a lower PHY. A DU may include a device configured to implement various processing functions, in particular including functions of a higher PHY, MAC, and RLC. The skilled person may realize that this is one example of a split of the network stack and DUs and RUs may have different split configurations. The RU may be linked to terminal devices 102 and 104 over a radio connection, and to the DU over a fronthaul interface.

In various examples, the fronthaul interface may be according to a Common Public Radio Interface (CPRI) or an Enhanced Common Public Radio Interface (eCPRI) configured to communicate over a connection via fiber optic cables, but there are also other communication mediums that may handle the fronthaul communication. In any event, the RUs may be serving a plurality of terminal devices, and there may be limitations in terms of link capacity and bandwidth with respect to the communication between the RUs and a corresponding DU over the fronthaul. It may desirable to address some of the fronthaul limitations.

It may be desirable to implement massive MIMO to provide extra system capacity with a plurality of antennas (64, or even 128) at the macro base station side, which usually support 8, 12 or even 16 concurrent Uplink/Downlink streams (i.e., antenna ports) at the same time/frequency resources. Due to the limited bandwidth of fronthaul from the antenna array to the BBU, the physical layer signal must be processed in the Radio Unit (RU) or split with certain processing at RU and some other processing in Distributed Unit (DU), as O-RAN defined.

The Coordinated Multi-point transmission/reception (COMP) technique may utilize the joint processing. CoMP may be considered to have two modes, a first mode with an independent eNB architecture that may be referred to as a Coordinated Scheduling/Beamforming (CS/CB) and a second mode that employs a centralized eNB that may be referred to as joint processing (JP). The JP mode may support joint processing in which multiple eNBs may serve to one UE in a joint manner. However, COMP is based on conventional network architecture, and the information exchange for joint processing may be limiting in some of the coordinated schemes. There may be issues to be addressed in terms of overhead and complexity. It may desirable to address the joint processing for the case with substantial number of antennas in dense scenarios with considerable number of users, where the front-haul constraint becomes the key bottleneck for optimal joint processing in O-RAN.

Furthermore, with separate processing across various cell sectors, in terms of performance (e.g., throughput) there may be limitations with respect to inter-cell and intra-cell interferences. While intra-cell interference may be minimized through beamforming techniques, it may be further desirable to handle inter-cell interferences as well, especially for cell-edge users in dense scenarios. Whitening filters, MMSE-IRC, and Successive Interference Cancellation (SIC) may be employed but the lack of information about the interferences may be limiting in certain scenarios. Accordingly, especially in uplink direction, RU may use a local knowledge for estimation of channel parameters (including self-estimated information or UE-based information such as CSIs). In such cases, it may be desirable to share the capability of interference cancellation between the RU and the DU.

In this disclosure, various precoding schemes for Joint processing in Communication Networks are provided. Various traditional communication networks are designed with a network centric approach that may provide non-uniform performance due to cell-center and cell-edge experiencing different SINR, owing to the fixed cell or sector boundaries. Cell Free Massive MIMO is an emerging paradigm in which effects of such cell/sector boundaries may be reduced or eliminated and a user-centric design approach can be formulated. To this end, joint processing of signals corresponding to multiple RUs may be considered one of the main problems known to enable Cell-free Massive MIMO as well as COMP-JT (Joint Transmission in CoMP).

One of the main challenges in joint processing, especially at DU, may include a processing means to invert a matrix of large dimensions ($8Nc \times 8Nc$) where Nc is the number of RUs in joint processing. Even for joint processing across 3 RUs, joint processing may result in a 24×24 complex matrix in MIMO demodulation, inverse of which would be computationally challenging in order to meet the 1 ms (or 0.5 ms) real-time budget in 5G NR. Hence, it may be desirable to perform partial interference cancellation (e.g. inter-cell) at the RUs, so that DU may perform calculations with a near-block diagonal effective channel matrix.

This disclosure may include various precoding schemes for reducing interference with an intention to maximize the throughput in downlink according to the fronthaul limitations, and various beam compression and received processing schemes for reducing interference with an intention to maximize the throughput in uplink according to the fronthaul limitations.

Figure 2:
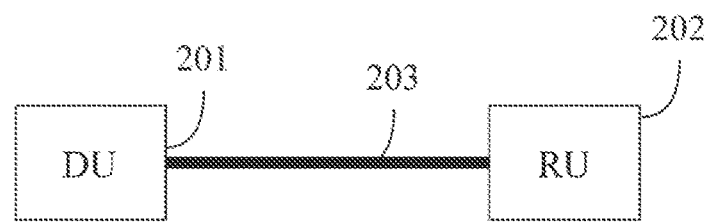
FIG. 2 shows an example of a fronthaul structure in a cloud-based RAN.

FIG. 2 shows an example of a fronthaul structure in a cloud-based RAN. The illustration shows a system including a DU 201 and an RU 202. A fronthaul 203 connects the DU 201 and the RU 202. An interface, such as CPRI or eCPRI may be used with as a fronthaul interface. As provided in this disclosure, the DU 201 may implement various functions for PDCP, RLC, MAC, and PHY layer, and the RU 202 may implement various functions for the PHY layer and RF functions to receive and transmit radio communication signals to terminal devices that are communicatively coupled to the RU 202. The term "communicatively coupled to" may also be referred to as "attached to" or "serve". The illustration shows that there is only one RU 202 is communicatively coupled to the DU 201, but the skilled person would appreciate that the DU 201 may be communicatively coupled to a plurality of RUs.

The DU 201 may perform various functions in the PHY layer that may be different from the PHY layer functions that the RU 202 performs. The DU 201 may be deployed close to the RU 202 on site on a commercial off-the-shelf (COTS) server and communicate with the RU 202 over the fronthaul 203. For example, in a system configuration with a 7-2 functional split, the DU 201 may perform higher PHY layer functions including precoding on antenna ports, layer mapping, modulation, scrambling, rate matching, coding and block segmentation, cyclic redundancy check (CRC) functions and the RU 202 may perform lower PHY layer functions including cyclic prefix (CP) functions, Fast Fourier Transform (FFT) functions, beamforming and port expansion functions, resource element mapping functions. The RU 202 may also perform RF functions. In various examples, the DU 201 and the RU 202 may be configured to operate with various functional split configurations, in particular different configurations for downlink and uplink.

Accordingly, the RU 202 may include a transceiver configured to receive and transmit radio communication signal to a plurality of terminal devices that the RU 202 may serve (e.g. UEs). The RU 202 may include or may be coupled to a plurality of antennas (e.g. an antenna array) to receive and transmit radio communication signals to the terminal devices. The RU 202 may perform beamforming operations (e.g. by applying beamforming weights) to communicate with the terminal devices. In various examples, the RU 202 may receive radio communication signals from the terminal devices and obtain baseband signals based on the received radio communication signals in the uplink. The RU 202 may further obtain radio communication signals from baseband signals and transmit radio communication signals to the terminal devices in the downlink.

The RU 202 may further include a processor configured to perform various processing functions, in particular with respect to the defined network stack functions for the RU 202. As provided for this illustrative example, the processor of the RU 202 may implement lower-PHY functions including the functions as provided for the illustrative example. Furthermore, the processor of the RU 202 may include a controller to perform various aspects as provided in this disclosure. The RU 202 may further include a memory to store data.

The transceiver of the RU 202 may further perform operations to communicate with the DU 201. The transceiver of the RU 202 may include circuits to receive and transmit communication signals from/to the DU 201 over the fronthaul 203. Accordingly, the processor of the RU 202 may control a fronthaul interface and transmit communication signals based on the received radio communication signals after the RU 202 performs the defined lower-PHY functions to the DU 201 over the fronthaul 203, so that the DU 201 may further process the communication signals that the RU 202 provides according to various functions designated for the DU 201. Similarly, the DU 201 may perform various processing functions designated for the DU 201 and transmit communication signals to be transmitted to the terminal devices to the RU 202 over the fronthaul 203, and the RU 202 may perform defined lower-PHY functions and also RF functions for the communication signals in order to transmit radio communication signals to the terminal devices.

The DU 201 may include a transceiver configured to receive and transmit communication signals from/to the RU 202 over the fronthaul. Furthermore, the transceiver of the DU 201 may transmit and receive signals from a control unit (not shown) that performs various functions of the network stack over a backhaul or a midhaul. In various examples, a combined unit (e.g. a BBU) may include the DU 201, so that the RU 202 may be communicatively coupled to the BBU over a fronthaul.

The DU may include a processor configured to perform various processing functions, in particular with respect to the defined network stack functions for the DU 201. As provided for this illustrative example, the processor of the DU 201 may implement RLC layer functions, MAC layer functions, and higher-PHY functions including the functions as provided for this illustrative example. Furthermore, the processor of the DU 201 may include a controller to perform various aspects as provided in this disclosure. The DU 201 may further include a memory store data.

Figure 3:
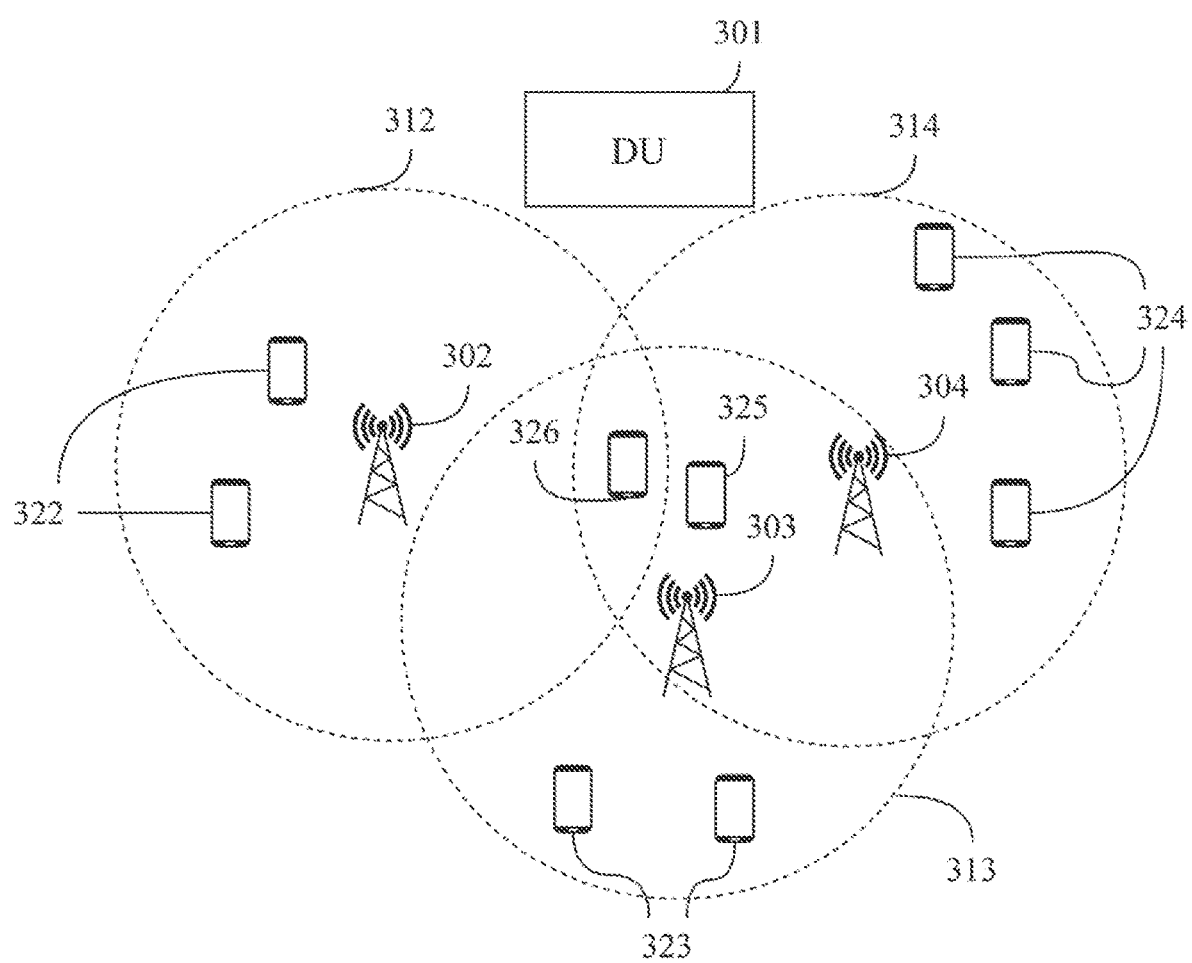
FIG. 3 shows an example of a radio communication network.

FIG. 3 shows an example of a radio communication network. The radio communication network include a DU 301 that is communicatively coupled to each RU of a plurality of RUs over a fronthaul (not shown), including a first RU 302, a second RU 303, and a third RU 304. Each RU may be located at different locations in order to provide service to different cell sectors, in a manner that each RU may provide service for terminal devices for a sector that may or may not overlap with another cell sector of another RU. In this example, the first RU 302 is configured to provide service for terminal devices in a first sector 312, a second RU 303 is configured to provide service for terminal devices in a second sector 313, and a third RU is configured to provide service for terminal devices in a third sector 314, and the cell sectors may overlap at certain locations. In various examples, each RU may be configured to provide services for substantially the same coverage area to multiple terminal devices, in which each of the terminal devices may be served by more than one RU for joint processing.

Accordingly, each RU may be serving a plurality of terminal devices within the respective sector of the RU to receive and transmit radio communication signals from/to terminal devices. In this illustrative example, the first RU 302 is configured to provide services for a first group of terminal devices including terminal devices 322 and the terminal device 326, and it may be referred to as the first group of terminal devices 322 are served by the first RU 302. The term served for this aspect may refer to a case of an existent radio connection between entities, or a case where terminal devices receive services at least for a function of a layer of an interconnection model with respect to the network stack. This may include a case where the first RU 302 serves to the first group of terminal devices 322, such as the first RU 302 may be a serving cell for the first group of terminal devices, and it may be referred to as the first group of terminal devices 322 are being served by the first RU 302, and such.

As indicated, there may be cases in which there are overlap at certain locations. For this aspect, one of the terminal devices 325 is depicted in such a manner, the terminal device 325 may be located to receive services in the second cell sector 313 and in the third cell sector 314. Similarly, the terminal device 326 is depicted to receive services from each of the first RU 302, the second RU 303, and the third RU 304, and hence served by all RUs 302, 303, 304. Accordingly, the second RU 303 may be serving a second group of terminal devices including terminal devices 323, the terminal device 325, and the terminal device 326. Similarly, the third RU 304 may be serving a third group of terminal devices including terminal devices 324, the terminal device 325, and the terminal device 326.

In the traditional communication network each RU may serve a plurality of distinct terminal devices. There are various examples in this disclosure considering joint precoding at multiple RU for each terminal device as one of the salient aspects. In an example, by joint precoding three 64 antenna cells or sectors may jointly precode symbols intended for a terminal device, which may lead to a 192 dimensional signal providing transmit diversity on the downlink and receive diversity on the uplink. Also, such high dimensional joint precoding can be used either for spatial multiplexing of symbols or for diversity combining schemes. Throughout this disclosure, one skilled in the art would be able to deduce that all precoding schemes can be extended simply to various possibilities of joint precoding across multiple RUs.

Accordingly, each terminal device 322, 323, 324, 325 may transmit and receive radio communication signals from/to the corresponding RU 302, 303, 304 that the respective terminal device 322, 323, 324, 325 is being served. In such a constellation, especially based on the locations of the RUs, each RU may encounter interferences with respect to radio communication activities between other RUs and the corresponding group of terminal devices. For example, the radio communication between each RU 302, 303, 304, and corresponding groups of terminal devices as provided in this illustrative example, may be subjected to interference based on radio communication signals exchanged between each of the other RUs 302, 303, 304 and corresponding group of terminal devices for each of the other RUs 303, 304.

For example, the radio communication between the first RU 302 and the first group of terminal devices may be subject to interference from radio communication signals exchanged between the second RU 303 and the second group of terminal devices and between the third RU 304 and the third group of terminal devices. Accordingly, with respect to the first RU 302, the radio communication between the second RU 303 and the second group of terminal devices, and the radio communication between the third RU 304 and the third group of terminal devices may be referred to as interfering radio communication in this example. Similarly, for the first RU 302, other RUs, such as the second RU 303 and the third RU 304 may be referred to as interfering RUs, and the first group of terminal devices and the second group of terminal devices may be referred to as interfering terminal devices (e.g. interfering UEs) in this disclosure. In this illustrative example, as the terminal device 325 that is served by both of the second RU 303 and the third RU 304, neither interfering UEs for the second RU 303 nor the third RU 304 may include the terminal device 325, as the terminal device 325 is being served by the second RU 303 and the third RU 304. In various examples, RUs may receive information indicating further relationship between UEs and other RUs from the corresponding UE that the RU is serving, or from a DU that the RU is communicatively coupled to.

Figure 4:
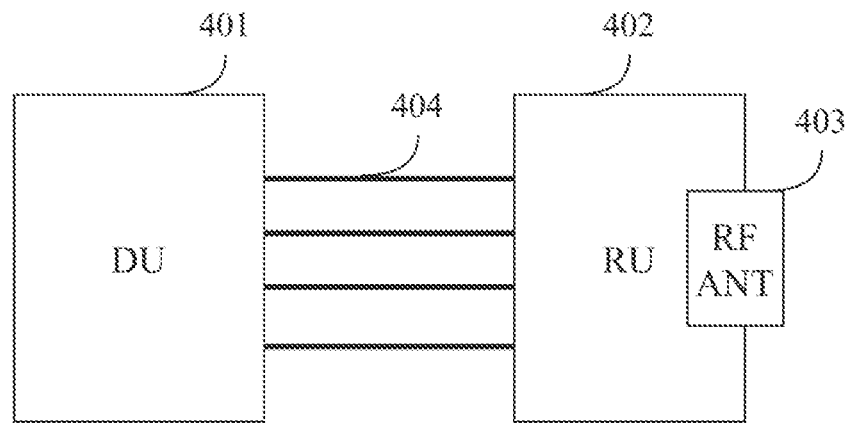
FIG. 4 shows an illustration with respect to a radio communication network.

FIG. 4 shows an illustration with respect to a radio communication network. The radio communication network may include a DU 401 and a plurality of RUs including the RU 402. The RU 402 may include, or may be coupled to, a plurality of RF antennas 403 (e.g. antenna array) and the RU 402 may perform beamforming using the plurality of antennas to transmit radio communication signals to a plurality of terminal devices. In various examples, the RU 402 may perform precoding for communication signals received from the DU 401 to transmit radio communication signals using the plurality of RF antennas 403 to the terminal devices that the RU 402 is serving. Similarly, the RU 402 may receive radio communication signals using the plurality of RF antennas 403 from the terminal devices and perform beam compression with respect to received radio communication signals to transmit communication signals to the DU 401. The RU 402 may be coupled to the DU 401 over a fronthaul 404.

Fronthaul limitations may be referred to as one of the constraints of such distributed (e.g. cloud based) radio access networks. There may be a number of terminal devices that the RU 402 may communicate at the same time. In massive MIMO systems, the number of antennas may be high (32, 64, 128, etc.) with an intention to increase the capacity of radio communication in terms of bitrates and link capacity, and there may be scenarios in which the communication between the RU 402 and the DU 401 may encounter limitations with respect to the fronthaul 404 in terms of bitrates and link capacity.

For example, the number of radio communication signals that the RU 402 may receive from the corresponding group of terminal devices may be more than the number of links (e.g. communication paths) that the RU 402 may transmit communication signals to the DU 401. For example, the RU 402 may be communicatively coupled to the DU 401 over the fronthaul allowing a number of data streams to be transmitted and/or received at an instance of time. Such limitation may be based on physical constraints (e.g. the number of optic fibres between the DU 401 and the RU 402), or based on virtual constraints at an instance of time (e.g. number of data streams allocated for the corresponding communication activity).

In this illustrative example, the number of links are depicted as four at the fronthaul 404, allowing for the RU 402 (or corresponding for the DU 401) to perform the communication activity between the RU 401 and the DU 401 with four links. In such cases, it may be desirable for the RU 402 to implement an effective mechanism to transmit communication signals using a first number of streams in response to a second number of radio communication signals that the RU 402 receives, in a case where the second number is greater than the first number. Such mechanism may be referred to as beam compression in this disclosure. In various examples, the RU 402 may perform a precoding based on number of links between the DU 401 and the RU 402 over the fronthaul by multiplying the communication signals to be transmitted to the DU 402 with a precoding.

Figure 5:
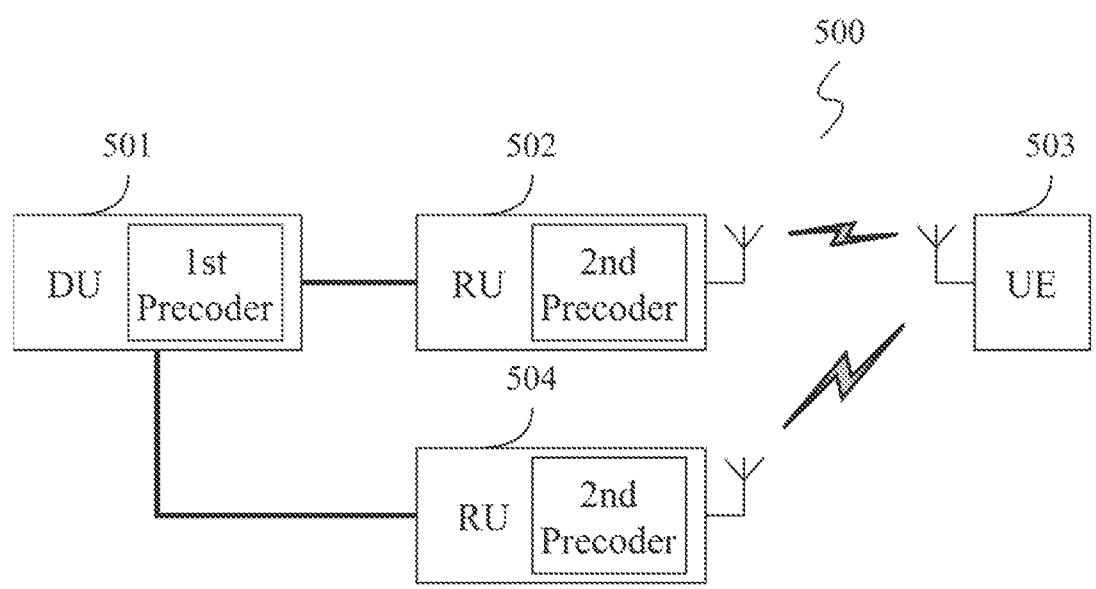
FIG. 5 exemplarily shows an illustration of a radio communication network.

FIG. 5 exemplarily shows an illustration of a radio communication network 500. In an example, the illustrated part of the radio communication network 500 provides a portion of the radio communication network provided with respect to FIG. 3. A DU 501 may include a transceiver configured to communicate with a plurality of RUs including the RU 502 and a second RU 504. The plurality of RUs (e.g. the second RU 504) may be serving a number of UEs, such that each RU of the plurality of RUs (e.g. the second RU 504) may be serving a group of UEs (not shown).

Accordingly, the RU 502 may be serving a group of UEs and one UE of the group of UEs may include the UE 503. Accordingly, any other UE of the plurality of UEs may be referred to as "other UE". Similarly, any other RU of the plurality of RUs may be referred to as "other RU". The second RU 504 may also be serving a group of UEs and one UE of the group of UEs may include the UE 503 as well. Accordingly, both RUs 502, 504 may be serving the UE 503, and the UE 503 may receive and transmit radio communication signals to the RU 502 and the second RU 504 within the radio communication network 500.

The terms "terminal device" and "user equipment" (UE) may be used to denote one of the communication endpoint of one or more data streams in both uplink or downlink. However, it is well known to those skilled in the art that this communication endpoint can denoted as a layer or port (e.g., 5G NR layer or port) identifying each data stream and typically correspond to one distinct DMRS or SRS signal configured for the UE. Henceforth, each layer can be identified to be served by a distinct set of RUs, and multiple layers may be precoded using different combinations of the RUs in the communication network. In this disclosure, although examples may have been provided in a manner to identify serving and interfering UEs with respect to each RU, it can be noted that it could also be understood in terms of serving and interfering layers corresponding to either the same or different UE and corresponding RU that performs precoding for the data streams.

The transceiver of the DU 501 may further be configured to communicate with an external control unit as provided in this disclosure.

The DU 501 may further include a processor that is configured to provide the designated functions for the network stack as provided in this disclosure. The processor of the DU 501 may further determine precoding parameters for each of the plurality of RUs that the DU 501 is communicatively coupled to, including the RU 502, so that the RU 502 (or other RUs) may precode radio communication signals to the UE 503 based on the precoding parameters that the DU 501 determines. The DU 501 may further determine precoding parameters for the DU 501 to apply for communication signals that the DU 501 may transmit to the RU 502 with respect to the UE 503. In various examples, the DU 501 may determine precoding parameters for the DU 501 based on the determined precoding parameters for the RU 502. In various examples, the precoding parameters may include a precoding matrix.

Accordingly, the DU 501 may apply a first precoder and the RU 502 may apply a second precoder for a downlink signal. When the DU 501 transmits a communication signal to the RU 502 for a transmission to the UE 503, a hierarchical application of precoding parameters may allow a flexible approach in order to manage the data links between the DU 501 and the RU 502 over the fronthaul, and also manage data links (e.g. radio communication channels) between the RU 502 and the UE 503 in an independent manner. Furthermore, such hierarchical application of precoding parameters may allow to handle interferences in a different manner and also in certain examples in an adaptive manner.

Similarly, the DU 501 may apply a first precoder and the second RU 504 may apply a second precoder for a downlink signal. When the DU 501 transmits a communication signal to the second RU 504 for a transmission to the UE 503, a hierarchical application of precoding parameters may allow a flexible approach in order to manage the data links between the DU 501 and the second RU 504 over the fronthaul, and also manage data links (e.g. radio communication channels) between the second RU 504 and the UE 503 in an independent manner. Furthermore, such hierarchical application of precoding parameters may allow to handle interferences in a different manner and also in certain examples in an adaptive manner.

The processor of the DU 501 may perform uplink channel estimations to obtain channel information indicating estimated channel parameters. In various examples, the DU 501 may perform a Least squares (LS) or Minimum mean-square error (MMSE) based channel estimation or a Bayesian inference-based channel estimation to obtain the estimated channel parameters. Traditional LS or MMSE-based channel estimation and other existing methods can be used for low complexity. To get better channel estimation results, especially for the dense scenario where a large number of users co-exist in the system, Bayesian inference-based channel estimation can be adopted.

In various examples, each RU may include a processor to perform uplink channel estimation to obtain the channel information indicating estimated channel parameters. UEs that are coupled to at least one RU of the plurality of RUs may provide estimated channel parameters for corresponding communication channels between the UE and the respective at least one RU that the UE is being served, for example as a channel state information (CSI) message. In various examples, in a time division duplex (TDD) systems, the DU 501 may obtain estimated channel parameters based on uplink sounding reference signals (SRS) (or any other pilot signals in a similar manner, such as DM-RS symbols) considering the channel reciprocity.

In various examples, each RU may perform uplink channel estimations to obtain estimated channel parameters with respect to the plurality of UEs in the radio communication network 500. Accordingly, each RU may include estimated channel parameters with respect to all of the UEs in the radio communication network. The estimated channel parameters may include a channel matrix with respect to the plurality of UEs of the radio communication network 500 that the DU 501 may provide services to through the plurality of RUs.

Accordingly, the DU 501 may obtain a matrix indicating estimated channel parameters (e.g. channel matrices) with respect to each communication channel between each of the plurality of RUs and each of the plurality of UEs in the radio communication network 500.

Considering the interferences that the radio communication signals between the UE 503 and the RU 502 may be subjected to, $y_1$ representing the received downlink radio communication signal, k representing an index defining a k-th UE in the radio communication network (k=1 representing UE 503), $V_k$ representing a precoding matrix for a k-th UE of the plurality of UEs in the radio communication network 500 ($V_1$ being the precoding matrix assigned for the UE 503), $x_k$ representing the radio communication signals transmitted to the k-th UE in the radio communication network 500 ($x_1$ being the radio communication signal transmitted to the UE 503), $H_{b_r}$ representing aggregated channel matrix of an r-th RU of the R RUs with respect to the plurality of UEs in the radio communication network, $H_{b_1}$ representing the aggregated channel matrix with respect to a channel estimation of the RU 502 for the UE 503 and the other UEs, $H_{r,k}$ representing the channel matrix with respect to the r-th RU (r=1 for the RU 502), a received downlink radio communication signal at the UE 503 may be formulated as:

$$y_1 = H_{b_1} V_1 x_1 + \Sigma_{k=2}^{K} H_{b_1} V_k x_k = [H_{1,1} H_{2,1} \ldots H_{R,1}] \Sigma_{k=1}^{K} V_k x_k.$$

In one example, especially when there is no fronthaul limitation between the DU 501 and the RU 502, the DU 501 may determine the precoding matrix for the RU 502 for radio communication signals to be transmitted to the UE 503 based on the channel matrices with respect to other RUs (e.g. the second RU 504) of the plurality of RUs with respect to the plurality of UEs, with an intention to mitigate inter UE-interference in the radio communication network 500. The processor of the DU 501 may employ a zero-forcing technique to determine the precoding matrix for the RU 502 for a transmission to the UE 503 in order to reduce interferences with respect to radio communication signals of the other RUs (e.g. the second RU 504) of the plurality of RUs. Accordingly, the processor of the DU 501 may apply a zero-forcing technique based on the channel matrices of the other RUs (e.g. the second RU 504) of the plurality of RUs with respect to the plurality of UEs, other than the RU 502.

In order to apply the zero-forcing technique based on the channel matrices of the other RUs (e.g. the second RU 504) of the plurality of RUs with respect to the plurality of UEs, other than the RU 502, the processor of the DU 501 may select a precoding matrix from a null space of an aggregated channel matrix including channel matrices of other RUs (e.g. the second RU 504) of the plurality of RUs with respect to the plurality of UEs. $H_{b_1}$ representing the aggregated channel matrix with respect to a channel estimation of the RU 502 for the plurality of UEs (including UE 503 and the other UEs), the precoder for the UE 503 $V_1$ E null $(\overline{H_{b_1}})$; ( $\overline{H_{b_1}} = [H_{b_2}, H_{b_3}, \ldots, H_{b_R}]$. The processor of the DU 501 may obtain the aggregated channel matrix by aggregating channel matrices of each of the other RUs (e.g. the second RU) with respect to the plurality of UEs. Accordingly, for this example, the aggregated channel matrix may include $[H_{b_2}, H_{b_3}, \ldots, H_{b_R}]$.

The DU 501 may also apply a zero-forcing technique in a similar manner for the second RU 504, by applying the zero-forcing technique based on the channel matrices of the other RUs (e.g. the RU 502) of the plurality of RUs with respect to the plurality of UEs. The processor of the DU 501 may select a precoding matrix from a null space of an aggregated channel matrix including channel matrices of other RUs (e.g. the RU 502) of the plurality of RUs with respect to the plurality of UEs as exemplarily provided with respect to RU 502 above.

The processor of the DU 501 may determine a precoding matrix for each one of the RUs in the radio communication network 500 to transmit radio communication signals to one of the UEs that the respective RU is serving based on estimated channel parameters of other RUs in the radio communication network 500 with respect to the plurality of UEs, in a similar manner as explained with respect to the RU 502 above.

In various examples, the DU 501 may recognize that a fronthaul limitation may be an issue based on number of communication signals scheduled to be transmitted to the RU 502. In a physical constraint, the DU 501 may recognize that the number of communication signals scheduled to be transmitted to the RU 502 is greater than the number of links between the DU 501 and the RU 502. In such cases, it may be desirable to apply zero-forcing technique in a selective manner.

In various aspects, a selection in order to avoid or at least to decrease the occasions that may result in a fronthaul limitation may be performed by the UE 503. Especially in a scenario where the UE 503 may be served by a subset of RUs, the UE 503 may initiate a radio connection with an RU (e.g. the RU 502) by selecting the RU 502. The UE 503 may select an RU based on comparing signal to noise ratios (SNRs) measured with respect to each of potential RUs in the subset. Accordingly, the UE 503 may select the RU 502 based on the measured SNRs (e.g. the best SNR).

The RUs may be configured to serve a predefined number of UEs Once the UE 503 initiates, or intends to initiate a radio connection with an RU, the RU may provide information indicating that the predefined number has been reached to the UE 503. Accordingly, the UE 503 may select another RU (e.g. second best SNR). In various examples, the UE 503 may select RUs in a random manner with an intention to provide a fairness.

After each UE in the radio communication network 500 has been served by at least one RU, RUs may choose which UEs may be further served until the predefined number for the corresponding RU is reached, if the number of UEs served by the corresponding RU is below the predefined number.

In accordance with various aspects of this disclosure, the DU 501 may further determine precoding parameters for the DU 501 based on the determined precoding parameters for a respective RU, to use the determined precoding parameters for the DU 501 for transmissions to the respective RU. Denoting $V_1^0$ as the first precoding matrix that the RU 502 may apply based on the determined precoding parameters (precoding matrix) according to any one of the examples, the processor of the DU 501 may determine the precoding matrix for the DU 501 based on an effective channel parameters for transmissions to the UE 503 over the RU 502 including the first precoding matrix and the channel matrix of the RU 502. In other words, $H_{b1}^0$ denoting the effective channel response for the DU 501 for a transmission to the UE503; the processor of the DU 501 may determine the precoding matrix for the DU 501 according to the effective channel $H_{b1}^0 = H_{b1} V_1^0$ for a transmission to the RU 502 for the UE 503. The processor may determine the precoding matrix based on a singular value decomposition as provided in this disclosure.

Figure 6:
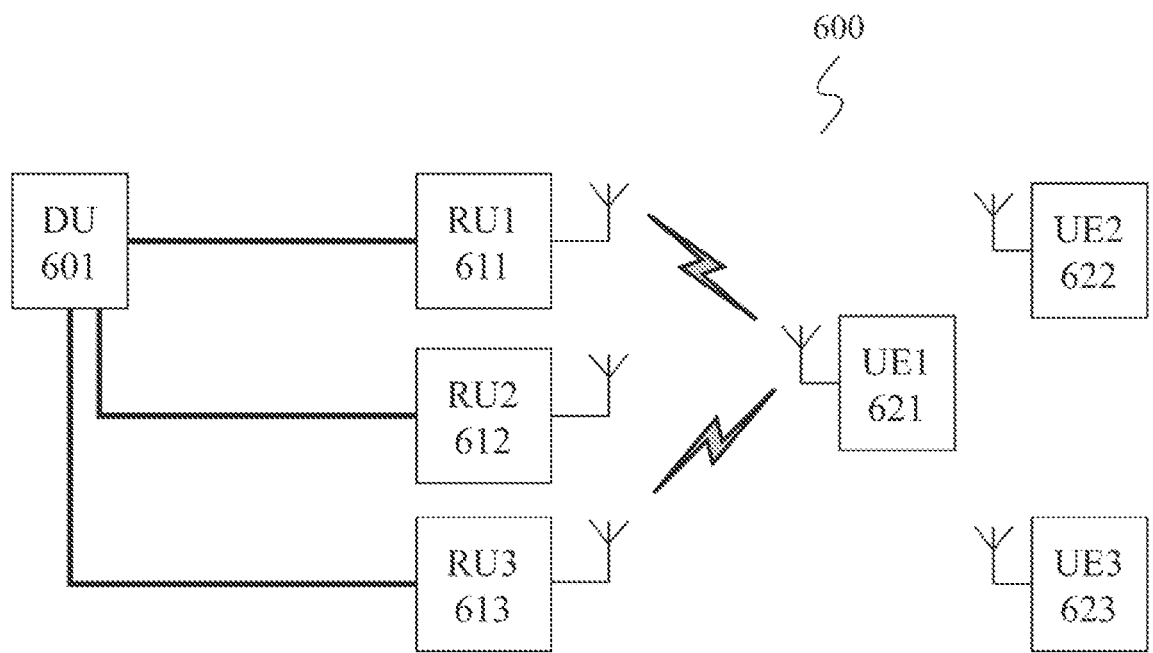
FIG. 6 exemplarily shows an illustration of a radio communication network.

FIG. 6 exemplarily shows an illustration of a radio communication network. Similar to FIG. 5, the illustrated part of the radio communication network 600 may provide a portion of the radio communication network provided with respect to FIG. 3. In this illustrative example, the radio communication network 600 is depicted by including a DU 601, and a plurality of RUs including a first RU 611, a second RU 612, and a third RU 613 that are communicatively coupled to the DU 601 over a fronthaul, and a plurality of UEs including a first UE 621, a second UE 622 and a third UE 623 that are served by at least one of the RUs. In this illustrative example, the first UE 621 is served by the first RU 611 and the third RU 613. The DU 601 and the RUs 611, 612, 613 may be configured in a similar manner as provided in this disclosure. There may be further RUs and UEs in the radio communication network 600, and in such cases the DU 601 may apply the techniques explained below for further RUs and DUs.

As the first UE 621 is served by both of the first RU 611 and the third RU 613, the processor of the DU 601 may determine one precoding matrix for both of the first RU 611 and the third RU 613 for transmissions to the first UE 621. The processor of the DU 601 may determine the precoding matrix for the first RU 611 and for the third RU 613 for radio communication signals to be transmitted to the first UE 621 based on channel matrices with respect to channels between the first RU 611 and the third RU 613 and other UEs (e.g. the second UE 622, and the third UE 623).

The processor of the DU 601 may employ a zero-forcing technique to determine precoding matrices for the first RU 611 and for the third RU 613 for transmissions to the first UE 621 in order to reduce interferences with respect to radio communication signals of other UEs (i.e. interfering UEs, e.g. the second UE 622, the third UE 623) of the plurality of UEs. The processor of the DU 601 may apply a zero-forcing technique based on the channel matrices of the first RU 611 and the third RU 613 of the plurality of RUs with respect to the other UEs (i.e. interfering UEs, e.g. the second UE 622, the third UE 623) in order to determine the precoding matrices.

In order to apply the zero-forcing technique based on the channel matrices of the first RU 611 and the third RU 613 with respect to the other UEs, the processor of the DU 601 may select a precoding matrix from a null space of an aggregated channel matrix including channel matrices of the first RU 611 and the third RU 613 with respect to the other UEs (i.e. interfering UEs, e.g. the second UE 622, the third UE 623). $H_{r,k}$ defining the channel matrix with respect to the channel between r-th RU and k-th UE, $V_1 \in \text{null}\,(\overline{H_{1,1}, H_{3,1}})$; $(\overline{H_{1,1}, H_{3,1}}) = [H_{1,2}\ H_{1,3},\ H_{3,2}\ H_{3,3}\ \ldots\ ]$. The processor of the DU 501 may obtain the aggregated channel matrix by aggregating channel matrices for channels between the first RU 611 and other UEs (i.e. interfering UEs, e.g. the second UE 622, the third UE 623) and the third RU 613 and other UEs (i.e. interfering UEs, e.g. the second UE 622, the third UE 623). Accordingly, for this example, the aggregated channel matrix may include$[H_{1,2}\ H_{1,3},\ H_{3,2}\ H_{3,3}\ \ldots\ ]$.

Each RU may be configured to precode using a precoding matrix specific to the UE that the respective RU serves. Accordingly, Nt denoting the number of transmit antennas that the serving RUs are configured to transmit radio communication signals to the respective UE, and M denoting a number of RUs serving to the respective UE, the DU 601 may obtain a matrix of Nt×M after the DU 601 applies the zero-forcing technique (e.g. by using the SVD as provided in this disclosure with respect to the aggregated channel matrix). In this illustrative example, assuming the first RU 611, and the third RU 613 having 64 transmit antennas, the DU 601 may obtain an 64×2 matrix after the SVD composition as provided in the related section. The DU 601 may send a first vector including the first column of the obtained 64×2 matrix to the first RU 611 as RU precoding matrix for the first RU 611, and the DU 601 may send a second vector including the second column of the obtained 64×2 matrix to the third RU 613 as RU precoding matrix for the third RU 613, for transmissions to the first UE.

In various examples, the DU 601 determine a precoding matrix for each of the first RU 611 and the third RU 613 separately in a similar manner based on channel matrices of channels of the respective RU with respect to the other UEs (i.e. interfering UEs, e.g. the second UE 622, the third UE 623). Accordingly, when the DU 601 determines the precoding parameters for the DU 601, the DU 601 may determine a first precoding matrix to transmit communication signals to the first RU 611 with respect to the first UE 621 based on the determined precoding matrix for the first RU 611, and a second precoding matrix to transmit communication signals to the third RU 613 with respect to the first UE 621 based on the determined precoding matrix for the third RU 613.

The processor of the DU 601 may determine a precoding matrix for each one of the RUs in the radio communication network 600 to transmit radio communication signals to one of the UEs that the respective RU is serving based on estimated channel parameters for RUs that are serving the respective UE, in a similar manner as explained with respect to the first RU 611 and the third RU 613 above.

Furthermore, the processor of the DU 601 may consider various constraints to calculate the precoding matrices for the RUs. The limitations of the fronthaul in terms of the link capacity between the DU 601 and the corresponding RU(s) may not carry the number of communication signals to be obtained with the corresponding precoding matrix for the RU. The null space may not be enough to null all other UEs (interfering UEs, e.g. the second UE 622, the third UE 623). Accordingly, the processor of the DU 601 may generate the aggregated channel matrix to calculate the null spaces based on a selection of a group of other UEs, such that the aggregated channel matrix may include only the selected group of other UEs.

The processor of the DU 601 may select the group of other UEs (interfering UEs, e.g. the second UE 622, the third UE 623) based on estimated channel gains according to the estimated channel parameters for the corresponding RU(s) and each of the other UEs (interfering UEs, e.g. the second UE 622, the third UE 623). The processor of the DU 601 may select a number of UEs from the group of other UEs (interfering UEs, e.g. the second UE 622, the third UE 623) in the radio communication network 600 based on the number of links between the DU 601 and the corresponding RU(s). The precoding matrix determination may be performed in a similar manner, but corresponding matrix dimensions for calculations may change.

Accordingly, UE selection and association policies may be defined with an intention to optimize several network features such as maximizing system throughput, achieving fairness through network load balancing, SNR at cell edge, user QoS requirements, etc. In one embodiment, user-cell association is dynamically reconfigured to reduce the weak interference observed at the DU of neighboring cells/sectors.

In accordance with various aspects of this disclosure, the DU 601 may further determine precoding parameters for the DU 601 based on the determined precoding parameters for a respective RU, to use the determined precoding parameters for the DU 601 for transmissions to the respective RU. Denoting $V_1^o$ as the first precoding matrix that the first RU 611 may apply based on the determined precoding parameters (precoding matrix) according to any one of the examples, the processor of the DU 601 may determine the precoding matrix for the DU 601 based on an effective channel parameters for transmissions to the first UE 621 over the first RU 611 including the first precoding matrix and the channel matrix of the first RU 611, as exemplarily provided with respect to FIG. 5. The processor may determine the precoding matrix based on a singular value decomposition as provided in this disclosure.

An RU may include one precoding matrix for each UE served by the RU, and used for radio transmissions for the respective UE. In accordance with various aspects of this disclosure, it may be desirable to have each RU to include a precoding matrix to communicate with a plurality of UEs that are served by the RU, with an intention to reduce the overhead for passing precoding information indicating corresponding precoding matrices for each UE.

Figure 7:
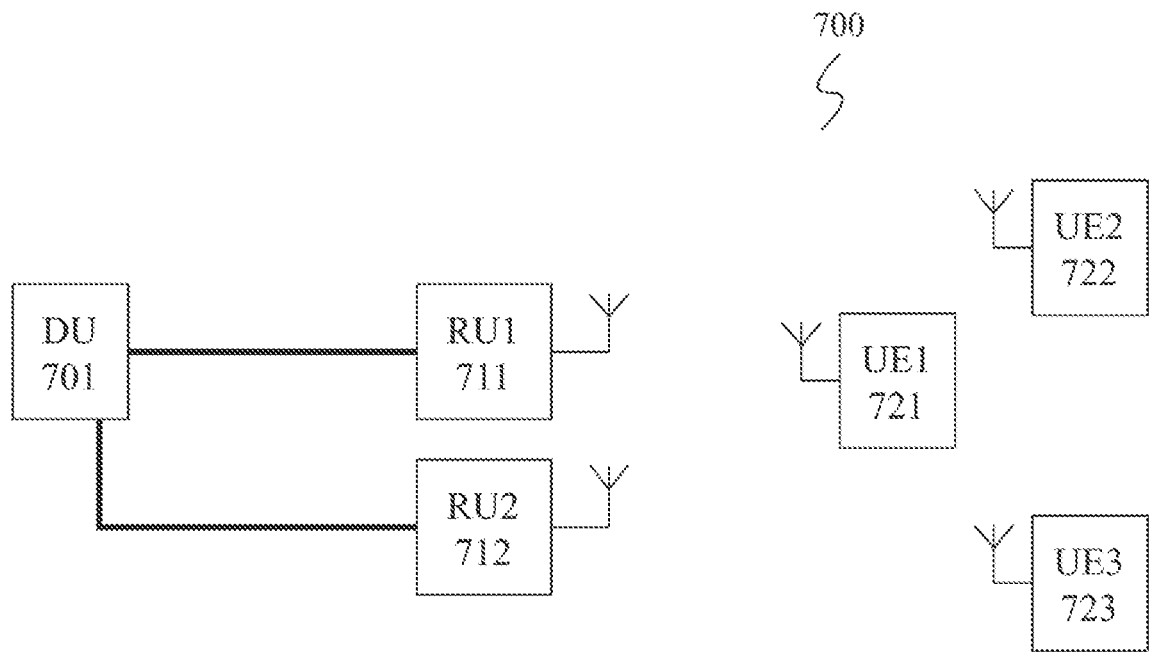
FIG. 7 shows an example of a radio communication network.

FIG. 7 shows an example of a radio communication network. Similar to FIG. 5 and FIG. 6, the illustrated part of the radio communication network 700 may provide a portion of the radio communication network provided with respect to FIG. 3. In this illustrative example, the radio communication network 700 is depicted by including a DU 701, and a plurality of RUs including a first RU 711 and a second RU 712 that are communicatively coupled to the DU 701 over a fronthaul, and a plurality of UEs including a first UE 721, a second UE 722 and a third UE 723 that are served by at least one of the RUs.

In this illustrative example, the first UE 721 is served by the first RU 711 and the second RU 712. The second UE 722 is served by the first RU 711. The third UE 723 is served by the second RU 722. In other words, the first RU 711 may serve to a first group of UEs including the first UE 721 and the second UE 722, and the second RU 712 may serve to a second group of UEs including the first UE 721 and the third UE 723. The DU 701 and the RUs 711, 712 may be configured in a similar manner as provided in this disclosure. There may be further RUs and UEs in the radio communication network 700, and in such cases the DU 701 may apply the techniques explained below for further RUs and DUs.

The processor of the DU 701 may determine the precoding parameters for one of the RUs to transmit radio communication signals to a group of the RU in order to reduce interferences of UEs that are not within the corresponding group of the RU. The processor of the DU 701 may determine the precoding parameters for the first RU 711 that is communicatively coupled to (and/or serves) the first group based on estimated channel parameters of the second group of the UEs that are served by the second RU 712 with an intention to reduce interferences of UEs which the first RU 711 does not serve. The processor of the DU 701 may determine the precoding parameters for the first RU 711 that is serving a plurality of UEs (e.g. the first UE 721 and the second UE 722) based on estimated channel parameters with respect to the second RU and other UEs (e.g. the third UE 723).

Furthermore, the processor of the DU 701 may further determine precoding parameters for the DU 701 with an intention to reduce interferences UEs within the corresponding group of the RU. Accordingly, the processor of the DU 701 may determine precoding parameters for the DU 701 for transmissions to a UE over one of the RUs based on estimated channel parameters with respect to channels between other UEs that are served by the respective RU and other RUs. In this illustrative example, the processor of the DU 701 may determine the precoding parameters of the DU 701 for transmissions to the first UE over the first RU 711 based on estimated channel parameters with respect to channels between other UEs of the first group of UEs (e.g. the second UE 722) and the second RU 712.

According to the illustrative example, $y_k$ representing the received downlink radio communication signal by a k-th UE, k representing an index defining the k-th UE in the radio communication network (k=1 representing the first UE 721, and so on), r representing an index defining the r-th RU in the radio communication network (r=1 representing the first RU 711, and so on), $V_{r1}$ representing a precoding matrix for the first RU 711, $V_{r2}$ representing a precoding matrix for the second RU 712, $V_{r,k}$ representing a precoding matrix of the DU 701 to transmit signals to a k-th UE over a r-th RU, $x_k$ representing the radio communication signals transmitted to the k-th UE in the radio communication network 700, $H_{k,r}$ representing the channel matrix with respect to channels between the r-th RU and the k-th UE, received downlink radio communication signals at each of the first UE 721, the second UE 722, and the third UE 723, may be formulated as:

$$y_1 = H_{1,1} V_{r1} (V_{1,1} x_1 + V_{1,2} x_2) + H_{1,2} V_{r2} (V_{2,1} x_1 + V_{2,3} x_3)$$

$$y_2 = H_{2,1} V_{r1} (V_{1,1} x_1 + V_{1,2} x_2) + H_{2,2} V_{r2} (V_{2,1} x_1 + V_{2,3} x_3)$$

$$y_3 = H_{3,1} V_{r1} (V_{1,1} x_1 + V_{1,2} x_2) + H_{3,2} V_{r2} (V_{2,1} x_1 + V_{2,3} x_3)$$

According to this illustrative example, the processor of the DU 701 may determine the precoding matrix for the first RU 711 based on estimated channel parameters with respect to the channel between the first RU 711 and the third UE 723 ($H_{3,1}$). The processor of the DU 701 may determine the precoding matrix for the second RU 722 based on estimated channel parameters with respect to the channel between the second RU 722 and the second UE 723 ($H_{2,2}$). The processor of the DU 701 may determine the corresponding precoding matrices based on a zero-forcing technique applied to the respective estimated channel parameters in a similar manner as provided in this disclosure.

Furthermore, the processor of the DU 701 may determine the precoding matrix for the DU 701 for a transmission to one of the UEs over an RU based on estimated channel parameters. Such channel parameters are with respect to channels between other UEs that are served by the RU and other RUs, and the precoding matrix of the respective RU. Accordingly, in this illustrative example, the processor of the DU 701 may determine $V_{1,1}$ denoting a precoding matrix for a transmission to the first UE 721 over the first RU 711 based on estimated channel parameters for the channel between the first RU 711 and the second UE 722 and the precoding matrix of the first RU 721 ($H_{1,1} V_{r1}$). Similarly, the processor of the DU 701 may determine $V_{2,1}$ denoting a precoding matrix for a transmission to the first UE 721 over the second RU 712 based on estimated channel parameters for the channel between the second RU 712 and the third UE 723 and the precoding matrix of the second RU 712 ($H_{2,3} V_{r2}$).

In order to apply the zero-forcing technique based on the respective channel matrices as provided in this disclosure. The processor of the DU 701 may select a precoding matrix from a null space of the respective channel matrices, as provided in this example. When there are more than one matrices (e.g. more than one channels with respect to the estimated channel parameters) the processor of the DU may generate an aggregated channel matrix including channel matrices as provided. In this illustrative examples, the null space operation may be denoted as $V_{r1} \in \text{null}(H_{3,1})$, $V_{r2} \in \text{null}(H_{2,2})$ for the precoding matrices of the first RU 711 and the second RU 712 respectively, and $V_{1,1} \in \text{null}(H_{1,2} V_{r1})$, $V_{1,2} \in \text{null}(H_{1,1} V_{r1})$ $V_{2,1} \in \text{null}(H_{2,3} V_{r2})$, ... for precoding matrices of the DU 701.

In various aspects, the DU 701 may further employ a selection process as provided with respect to FIG. 6. In various examples, and especially with respect to the illustrative example of FIG. 7, the determination of RU precoding parameters for an RU may actually be performed based on estimated channel parameters at the corresponding RU without involvement of other RUs. Accordingly, especially with respect to the aspects provided in FIG. 7, an RU may determine precoding parameters for itself in a similar manner. Accordingly, the processor of the RU (e.g. the first RU 711 or the second RU 712) may perform various operations as provided in this disclosure with respect to the DU 701 to determine the RU precoding parameters similarly.

However, the above aspects should not be limiting for the purpose of this disclosure, and principally any one of the RUs may perform the same or similar operations to calculate precoding parameters for the RU, which were exemplified for a corresponding DU that the RU is communicatively coupled to. In various examples, the RU may need to exchange information (e.g. estimated channel parameters) with the DU, or at least some of the plurality of UEs, to obtain the estimated channel parameters, and the processor of the RUs may be configured to perform the operations to determine RU precoding parameters which were exemplified for a DU. Also, the RUs might apply the RU precoding parameters calculated at the DU and forwarded to the RU, especially when fronthaul allows sharing of precoding information. Furthermore, the skilled person would also recognize that the examples above provided with respect to downlink operations, and similar principles may also be followed for uplink operations as well.

Furthermore, a DU may be configured to perform according to each of the aspects in terms of determining RU precoding parameters and DU precoding parameters as provided in this disclosure. In various examples, the DU may determine the method to calculate precoding parameters according to the situation. For example, the DU may determine to apply the zero-forcing technique according any one of aspects provided in this disclosure based on the fronthaul limitation. It may be desirable to perform precoding according to other known method when the fronthaul capacity allows. Accordingly, the DU (and the processor of the DU as well) may be configured to operate in a first operation mode in which the DU applies one of the zero-forcing techniques according to any one of the aspects, and the DU may operate in a second operation mode in which the DU applies any other known methods to transmit signals.

Furthermore, the DU may determine which zero-forcing technique to perform as provided with this disclosure based on the fronthaul limitation. As indicated above, the DU may apply the zero-forcing technique which was provided as an example with respect to FIG. 5 in situations where there are no fronthaul limitations. Based on an indication received from the DU or calculations performed by the DU indicating that there are fronthaul limitations, the DU may apply other zero-forcing techniques that were provided in this disclosure.

Furthermore, the DU may encode information indicating the determined RU precoding parameters (e.g. precoding matrices) for a transmission to a respective RU by encoding the precoding parameters. In various examples, the DU and the RU may include a predefined codebook, and the DU may encode information indicating a precoder index from the predefined codebook based on the determined RU precoding parameters for a transmission to the respective RU. The RU may receive the precoder index and select a precoding matrix from the predefined codebook based on the received precoder index. Furthermore, the DU may transmit communication signals to each of the RUs based on determined DU decoding parameters for the respective RU.

Uplink Joint Processing

Uplink scenarios may also involve various applications with or without fronthaul limitations. For uplink configuration, the RU may perform front-end processing till beam selection and compression with respect to the functions of the network stack and RF functions as indicated with respect to FIG. 2. Estimated channel parameters may similarly be obtained at the RU based on DM-RS or SRS signals. The RU may perform beam compression and transmit communication signals to the DU. In various scenarios where there is no fronthaul limitation, the RU may not perform the beam compression.

It may be considered that each RU is a standalone node and it may be desirable for the RU to handle the radio communication between the RU and the terminal devices (e.g. UEs) served by the RU. However, the radio communication signals with respect to the neighbor cells may reach the RU as well and the radio communication signals between the RU and the terminal devices served by the RU reaching other RUs resulting in interference in uplink and downlink, even if any beamforming is employed. Accordingly, it may be further desirable to address the interference in such distributed RANs.

Joint signal processing in which baseband signals received at an RU are forwarded to a DU may turn these interferences into useful signals and improve the system performance significantly. As an example, in O-RAN architecture, one DU can connect to multiple RUs allowing the joint processing of uplink and downlink signal processing at DU. However, the fronthaul bandwidth limit may still be an obstacle, as well as the large-scale MIMO processing complexity for an optimal global joint processing of uplink and downlink. Accordingly, it may be desirable to leverage the fronthaul bandwidth by selectively transmitting uplink/downlink signals and processing large scale (N*64 or N*128 or even larger) massive MIMO signals in an efficient manner with a desire to achieve a high performance.

Referring back to FIG. 3, in a radio communication network 300 as provided in the illustrative example, each RU may perform a zero-forcing technique as provided in this disclosure in order to zero-force interferences with respect to communication signals sent to other RUs. Each of the RUs in the radio communication network 300 may be configured to determine precoding parameters based on estimated channel parameters and precode data streams by multiplying signals with those parameters and transmitted to the DU 301. Following paragraphs will provide examples with respect to the first RU 302, but each RU may be configured in a similar manner.

The first RU 302 may further include a measurement circuit to perform measurements according to reference signals, such as a demodulation reference signal or sounding reference signal (SRS) received from each terminal devices 322, 323, 324, 325 in the radio communication network 300, and the processor of the first RU 302 may perform estimations to obtain channel parameters with respect to each of the terminal devices 322, 323, 324, 325 representing the channel between the first RU 302 and each of the terminal devices 322, 323, 324, 325. The first RU 302 may employ various uplink channel estimation techniques including LS or MMSE based channel estimation, or Bayesian inference techniques.

The processor of the first RU 302 may obtain estimated channel parameters (e.g. a channel matrix) for each of the cell sectors 312, 313, 314 in the radio communication network 300. Each channel matrix may include estimated channel parameters for channels between the first RU and a terminal device of the respective group of terminal devices of the respective cell sector. In this illustrative example, the processor of the first RU 302 may obtain a first channel matrix $H_{1,1}$ based on channel estimations performed for the first group of terminal devices that are served by the first RU 302 including the terminal devices 322, a second channel matrix $H_{1,2}$ based on channel estimations performed for the second group of terminal devices that are served by the second RU 303 including the terminal devices 323 and the terminal device 325, and a third channel matrix $H_{1,3}$ based on channel estimations performed for the third group of terminal devices that are served by the third RU 304 including the terminal devices 324 and the terminal device 325.

Processor of other RUs may further obtain estimated channel parameters in a similar manner, such that the processor of the second RU 303 may obtain $H_{2,1}$, $H_{2,2}$, and $H_{2,3}$; and the processor of the third RU 304 may obtain $H_{3,1}$, $H_{3,2}$, and $H_{3,3}$.

The processor of the first RU 302 may determine precoding parameters based on estimated channel parameters with respect to terminal devices in the radio communication network 300 that are not served by the first RU 302, (i.e. that do not belong to the first group of terminal devices). The terminal devices in the radio communication network 300 that are not served by the first RU 302 (e.g. terminal devices 323, terminal devices 324, the terminal device 325) may be referred to as interfering terminal devices (e.g. interfering UEs) in this disclosure.

The first RU 302 may apply a zero-forcing technique based on the estimated channel parameters with respect to the interfering terminal devices (e.g. $H_{1,2}$, $H_{1,3}$) with an intention to null or reduce interferences due to radio communication with the second RU 303 and the third RU 304. Accordingly, the first RU 302 may determine a precoding matrix according to a selection from a null space of an aggregated matrix including $[H_{1,2}, H_{1,3}]$. In other words, $V_1$ E null $(\overline{H_{1,1}})$; $(\overline{H_{1,1}})=[H_{1,2}\ H_{1,3}]$, where $V_1$ represents the precoding matrix for the first RU 302. The second RU 303 and the third RU 304 may also select respective precoding matrices $V_2$ and $V_3$ in a similar manner. Each of the RUs may use singular value decomposition technique to identify the null space of the respective matrices as provided in this disclosure, while the SVD based null space method is not meant to be restrictive.

FIG. 8 exemplarily shows an illustration of a matrix that a DU may process according various aspects of this disclosure. Accordingly, in an ideal scenario in which the first RU 302, the second RU 303, and the third RU 304 applies the zero-forcing technique as provided above, the DU may perform operations to process received communication signals $Y_1, Y_2, Y_3$ to obtain transmitted symbols $X_1, X_2, X_3$ by calculating the inverse of the provided 48×24 matrix. For the illustration of the matrix in FIG. 8, maximum 8 layers per cell sectors based on 5G NR limitation have been chosen as an example, while the matrix dimensions could vary depending on processed layers. Beam forming vectors and received communication signals are arbitrarily chosen as 16 dimensional (16×3=48) in order to exemplarily indicate a link capacity of the fronthaul allowing to transmit 16 data streams on the downlink (maximum allowed 5G NR downlink layers), which can also be used on the uplink. Received signal at DU is denoted as [Y$_1$, Y$_2$, Y$_3$]=[V$_1$R$_1$,V$_2$R$_2$,V$_3$R$_3$] wherein R$_1$,R$_2$,R$_3$ includes received signals at the first RU 302, the second RU 303, and the third RU 303 respectively. Scheme may be extended irrespective of whether each UE is assigned single or multiple communication streams that are typically mapped onto layers.

Accordingly, by applying zero-forcing technique as provided above, processing complexity at the DU 301 may be reduced since the effective channel matrix may become a block diagonal matrix, and MIMO demodulation (solving for X$_1$, X$_2$,X$_3$) may only involve a number of 8×8 matrix inverses (based on the number of RUs that are communicatively coupled to the DU 301) that may need less processing power as compared to a single 24×24 matrix inverse. Hence, by completely removing inter-cell interference at each of the RUs 302, 303, 304, complexity at DU can be made linear time (three 8×8 matrix inverses) instead of polynomial time (one 24×24 matrix inverse). This may result in roughly 9 times less complexity for certain scenarios. Accordingly, a hierarchical processing of interference on such a distributed system may employ a split processing and further be configured to be based on a performance-complexity tradeoff considering the processing capabilities of each of the RUs and the DUs.

Figure 9:
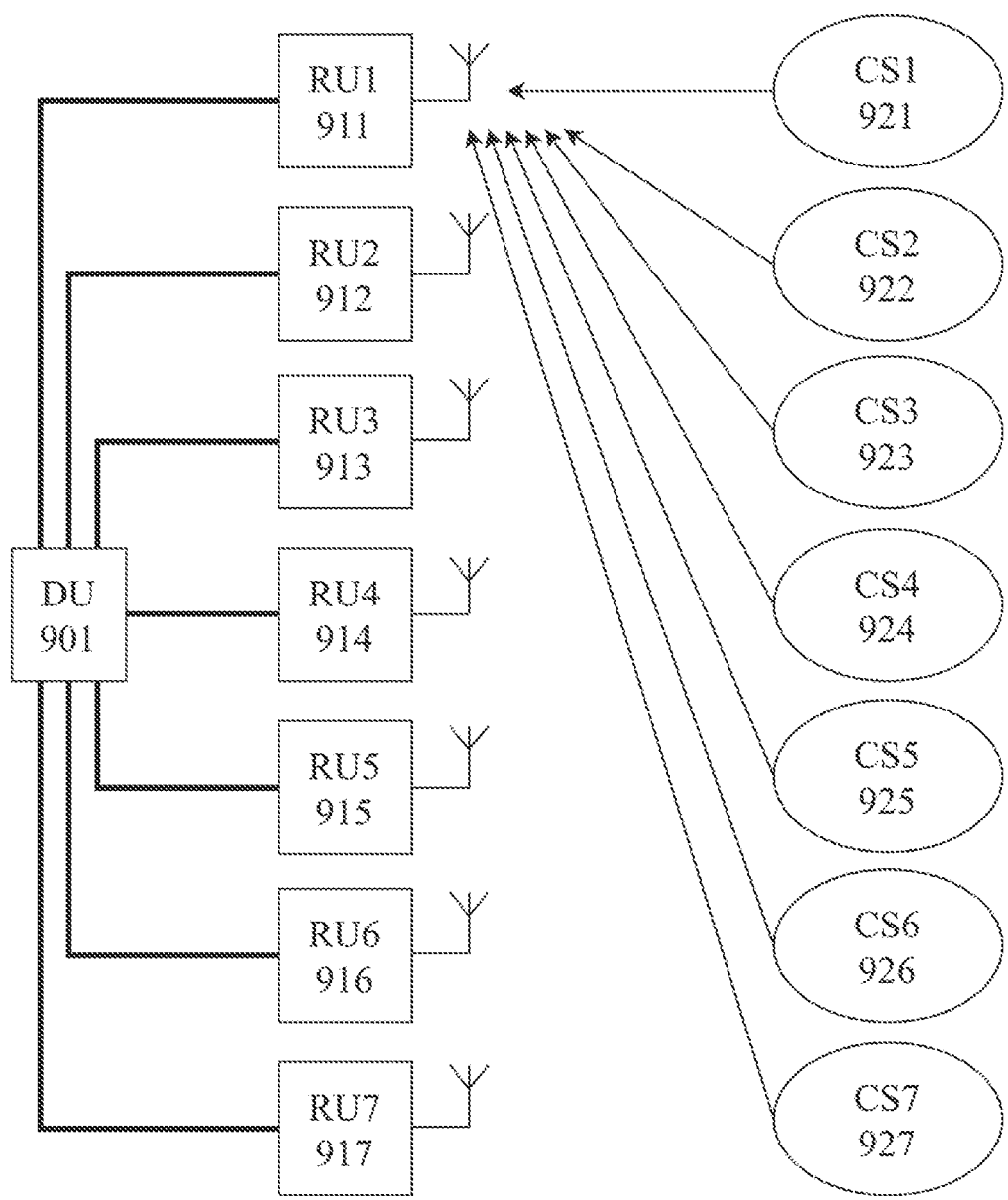
FIG. 9 exemplarily shows a radio communication network.

FIG. 9 exemplarily shows a radio communication network. The radio communication network 900 includes a plurality of RUs including an RU1 911 configured to provide services for a cell sector CS1 921, an RU2 912 configured to provide services for a cell sector CS2 922, an RU3 913 configured to provide services for a cell sector CS3 923, an RU4 914 configured to provide services for a cell sector CS4 924, an RU5 915 configured to provide services for a cell sector CS5 925, an RU6 916 configured to provide services for a cell sector CS6 926, an RU7 917 configured to provide services for a cell sector CS7 927. Each cell sector may include a group of UEs configured to receive services from the respective RU of the cell sector. Accordingly, each RU may be serving a group of UEs. The illustrative example is provided with respect to the RU1, however all RUs may operate in a similar manner.

In various examples, each group of UEs may include multiple UEs. With each group of UEs for a respective RU, there may be UEs that may also be served by other RUs of the radio communication network 900. For example, the plurality of UEs that are served by the RU1 911, may further be served by any other RUs of the plurality of RUs in this illustrative example.

While the RU1 may communicate by transmitting radio signals to, and receiving radio signals from the group of UEs in CS1 via a plurality of antennas, the antennas of the RU1 may also receive interferences with respect to radio signals exchanged between other RUs 912, 913, 914, 915, 916, 917 and respective groups of other UEs in respective cell sectors 922, 923, 923, 924, 925, 926, 927 that are depicted as arrows directed to the RU1 from each of the cell sectors 922, 923, 923, 924, 925, 926, 927. Accordingly, for this illustrative example, the RU1 may receive (and transmit) radio signals, that may be referred to as "desired radio communication signals", from the group of UEs in CS1 921, and the RU1 may receive (and transmit) radio signals that may be referred to as "interfering radio signals", from other groups of UEs in other cell sectors in the radio communication network 900.

It may be notated as follows, $\overline{y_1}$ represents the received uplink signal at the DU 901 from the RU1 911 on which V$_1$ is applied, y$_1$ representing received radio signals at the RU1 911, k representing an index defining a RU(k) in the radio network 900 (k=1 representing RU1 911), V$_1$ representing a precoding matrix of the RU1 911 in the radio communication network 900, x$_k$ representing the radio signals transmitted to the RU(k) in the radio communication network 900 (x$_1$ being the radio signals transmitted to the RU1 911 from the respective group of UEs), H$_{1k}$ representing estimated channel matrices with respect to CS(k), N$_1$ representing an assumed noise (typically white gaussian), then received uplink signal at the DU 901 may be formulated as:

$\overline{y_1}$=V$_1$y$_1$=H$_{11}$V$_1$x$_1$+V$_1$($\Sigma_{k=2}^{7}$H$_{1k}$x$_k$+N$_1$); in which H$_{11}$V$_1$x$_1$ denotes a desired part of received signal for the DU 901 for signals received from the RU1 911. As exemplarily provided with respect to FIG. 8, provided that there is no fronthaul limitation, and in ideal conditions, the RU1 911 may determine a precoding matrix to remove the interfering signals that may be denoted as $\Sigma_{k=2}^{7}$H$_{1k}$x$_k$+N$_1$ in the equation. In such scenario, the RU1 911 may apply the zero-forcing technique based on estimated channel parameters using an aggregated channel matrix of H$_{int}$=[H$_{12}$ H$_{13}$ H$_{14}$ H$_{15}$ H$_{16}$ H$_{17}$]$^T$. For this illustrative example, each of the 7 RU may be configured to support 64 streams for a group of UEs (each group with 8 data streams) via their plurality of antennas, and so, the aggregated channel matrix would be of dimension 48×64. Accordingly, the matrix would at least have a 16 dimensional null space.

In accordance with various aspects, because of the limited processing capability at the RUs, it may be desirable for the RU1 911 to determine the precoding matrix based on just a subset of the estimated channel parameters. The RU1 911 may determine the precoding matrix based on a subset of channel matrices selected from H$_{1k}$. The RU1 911 may determine the precoding matrix based on estimated channel parameters with respect to one or more groups of UEs that are served by other RUs in the radio communication network 900. The RU1 911 may determine the precoding matrix by applying a zero-forcing technique based on the subset of estimated channel parameters.

For example, the RU1 911 may apply the zero-forcing technique based on an aggregated channel matrix including channel matrices with respect to one or more RUs of the plurality of other RUs based on a selection, in which the channel matrices of one or more other RUs may define the subset.

In various examples, each RU may obtain the aggregated channel matrix including one or more other RUs from the estimated channel parameters. 901. The processor of a RU may select one or more groups of the UEs that are served by other RUs in the radio communication network 900 based on their interference. It may be desirable for the respective RU to reduce interference with respect to communication between one or more groups of the UEs and the respective other RUs. In various examples, the processor of RUs may estimate interference strength by calculating the norm of the corresponding channel matrix with respect to one RU and a selected group of UEs from the plurality of UEs.

The processor of a RU may select estimated channel parameters for one or more groups of the UEs that are served by other RUs in the radio communication network 900 based on other considerations as well. Considerations may include Quality of Service (QoS) requirements with respect to one or more UEs in each of the other groups. Furthermore, the processor of an RU may select the estimated channel parameters for the one or more groups of the UEs that are served by other RUs in the radio communication network 900 based on a user placement in the corresponding cell sector. The RU may select the estimated channel parameters based on a location of each of UEs of a group of the UEs relative to the location of the RU, or relative to the location of the other RU that each UE is being served. Other considerations may further include network fairness for the radio communication network (e.g. a parameter representing the fairness of the communication network), or availability of measurement results (e.g. CSI information). The RU may perform the selection based on any other kind of consideration.

For this illustrative example, the processor of the RU1 911 may apply the zero-forcing technique based on an aggregated channel matrix including channel matrices with respect to one or more other RUs of the plurality of other RUs based on a selection with respect to the interference of the groups of UEs in the radio communication network 900. Accordingly, the processor of the RU1 911 may calculate the norms of each of the channel matrices from $H_{int}$ including $H_{12}$, $H_{13}$, $H_{14}$, $H_{15}$, $H_{16}$, $H_{17}$. The processor of the RU1 911 may sort the channel matrices by their norms. Furthermore, the processor of the RU1 911 may determine to select two of the six channel matrices in this illustrative example. As indicated above, the processor of the RU1 911 may determine the number of channel matrices to select from the exemplary six channel matrices based on the number of layers or streams supported in standards or based on the fronthaul limitations, or based on a predefined number to reduce the complexity of computation at the RU.

With an assumption that the processor of the RU1 911 has selected the channel matrices $H_{12}$, $H_{13}$ to apply the zero-forcing technique, the aggregated channel matrix that the RU1 911 may apply the zero-forcing technique may include $[H_{12}\ H_{13}]$. Accordingly, the precoding matrix $V_1$ may be formed by selecting vectors from the null space, i.e., $V_1 \in \text{null}\,([H_{12}\ H_{13}]^T)$. Such selection of precoding matrix may result in a received communication signal at DU 901 from the RU1 911 as $y_1 = V_1 y_i = H_{11} V_1 x_1 + V_1 (\Sigma_{k=4}^{7} H_{1k} x_k) + V_1 N_1$, in which $H_{11} V_1 x_1$ represents a desired signal with respect to transmission via RU1 911 and corresponding served group of UEs within the sector CS1 921, $V_1(\Sigma_{k=4}^{7} H_{1k} x_k)$ represents the residual interfering signal as a result of applied zero-forcing technique at RU1 911 for the channels $H_{12}$, $H_{13}$, and $V_1 N_1$ represents the colored noise.

In various examples, the DU 901 may apply further interference reduction techniques, such as MMSE-IRC or whitening filters with an intention to remove at least a portion of the residual interfering signal. Furthermore, due to distances between RUs and correspondingly the cell sectors with respect to the RUs and associated path loss in-between, some of the interference links may be weak in a manner that DU 901 may disregard with negligible loss in performance.

The above examples with respect to the application of the zero-forcing technique as provided in this disclosure are provided according to the RU1 911. In various examples, each of the other RUs 912, 913, 914, 915, 916, 917 may apply a zero-forcing technique in a similar manner as provided in this disclosure based on the same or other considerations, so that the DU 901 may receive communication signals from each RUs 911, 912, 913, 914, 915, 916, 917 in a similar manner.

Figures 10, 11:
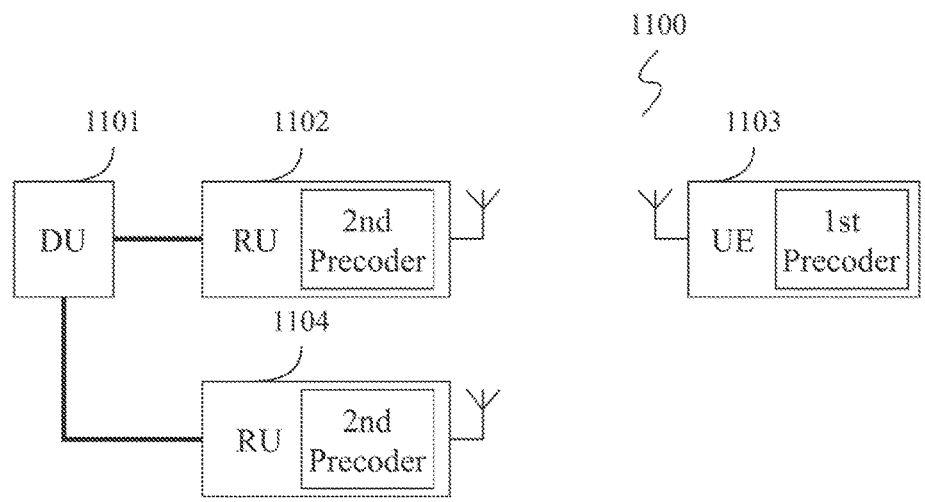
FIG. 10 exemplarily shows a representation of a matrix to be processed at the DU.
FIG. 11 shows an example of a radio communication network.

FIG. 10 exemplarily shows a representation of a matrix to be processed at the DU, according to the illustrative example of FIG. 9. Each RU 911, 912, 913, 914, 915, 916, 917 may have applied a zero-forcing technique based on estimated channel matrices with respect to two groups of UEs that are served by two other RUs within the radio communication network 900.

Accordingly, the RU1 911 may have applied a zero-forcing technique for estimated channel parameters with respect to channels $H_{12}$, $H_{13}$, the RU2 912 may have applied a zero-forcing technique for estimated channel parameters with respect to channels $H_{23}$, $H_{24}$, the RU3 913 may have applied a zero-forcing technique for estimated channel parameters with respect to channels $H_{34}$, $H_{35}$, the RU4 914 may have applied a zero-forcing technique for estimated channel parameters with respect to channels $H_{45}$, $H_{46}$, the RU5 915 may have applied a zero-forcing technique for estimated channel parameters with respect to channels $H_{56}$, $H_{57}$, the RU6 916 may have applied a zero-forcing technique for estimated channel parameters with respect to channels $H_{67}$, $H_{61}$, the RU7 917 may have applied a zero-forcing technique for estimated channel parameters with respect to channels $H_{71}$, $H_{72}$.

Each RUs may have applied the zero-forcing technique in order to reduce interference from two groups of UEs that are served by two other RUs within in the radio communication network 900, in which the two groups of UEs have the strongest interference for the respective RU. In various examples, the RUs may have selected the two groups of UEs based on other considerations.

Accordingly, the resulting matrix 1001 at the DU 901 may become a matrix of 112×56 dimension in order to obtain 56 symbols that the RUs 911, 912, 913, 914, 915, 916, 917 may have transmitted to the DU 901. For this example, each RU is configured to transmit 16 data streams to the DU 901, resulting a 112×1 signal vector.

Also, as indicated above, in various examples, the DU 901 may apply further interference reduction techniques, such as MMSE-IRC or whitening filters with an intention to remove at least a portion of the residual interfering signal for all RUs 911, 912, 913, 914, 915, 916, 917. Furthermore, due to distances between RUs with considerable cell radius and associated signal path loss, some of the interference links may be weak in a manner that DU 901 may disregard. Accordingly, the DU 901 may obtain a near-block diagonal matrix to demodulate the symbols.

In various examples, the DU 901 may be configured to apply a closed-loop power control scheme. Accordingly, the DU 901 may send transmit power control (TPC) commands to a UE, or a group of UEs served by a RU, with an intention to reduce interference from the respective UE or the respective group of UEs based on received communication signals from RUs in the radio communication network 900. The processor of the DU 901 may determine which UEs to send TPC commands with an intention to reduce residual interference due to signals received from a RU after the application of the zero-forcing technique.

In various examples, the DU 901 may be configured to schedule and allocate resources for UEs. Accordingly, the DU 901 may schedule and allocate resources to a UE, or a group of UEs of an RU, with an intention to reduce residual interference from the respective UE or the respective group of UEs based on received signals from RUs in the radio communication network 900. The processor of the DU 901 may determine the scheduling and allocation with an intention to reduce residual interference due to signals received from a RU after the application of the zero-forcing technique.

After applying the zero-forcing techniques for the channels having the strongest interference by using beamforming and/or precoding schemes at RUs as provided in this disclosure, and by using several features to reduce the residual weak interference at the DU 901, the DU 901 may observe a near block diagonal matrix as the effective channel. Accordingly, the processing complexity with respect to taking the inverse of the effective channel matrix may be reduced. Although weak interference may not have all zero channel coefficients, channel coefficients would be quite negligible that MMSE-IRC or whitening filter may also be employed at reasonable complexity. Even in the case that some of the weak interference channel cannot be ignored, it may lead to a sparse linear system of equations, which the processor of the DU 901 may solve using a simpler sparse matrix inverse method.

In various examples, RUs may employ the zero-forcing techniques as provided in this disclosure in an adaptive manner. It may be desirable for a RU to apply the zero-forcing techniques as provided in this disclosure especially when interference signal strength from other cell sectors are relatively high (e.g. higher than desired signal strength). When interfering signals are at a relatively low power, RUs may perform other techniques, such as maximal ratio combining (MRC) or matched filtering based precoding or beam compression, and DUs may accordingly perform MMSE-IRC.

Accordingly, any one of the RUs as provided in this disclosure may include a first mode of operation in which the RU (e.g. RU1 911) may apply the zero-forcing technique. Furthermore, in a second mode of operation, the processor of the RU1 911 may apply MRC or matched filtering to transmit signals to the DU 901 based on received radio signals from the UEs.

In order to determine the mode of operation to transmit communication signals to the DU 901, the processor of the RU1 911 may determine a power parameter of the signal received from the group of the UEs that the RU1 911 is serving within the cell sector CS1 921. As indicated before, these signals may be referred to as desired received signal for the RU1 911. Furthermore, the RU1 911 may also determine a power parameter for the interfering signals (e.g. interfering radio signals from communication between other RUs and groups of UEs with respect to each of the other RUs). In various examples, the RU1 911 may calculate a norm for each of the channel matrices $H_{12}$, $H_{13}$, $H_{14}$, $H_{15}$, $H_{16}$, $H_{17}$ to determine the power parameters. The power parameter for the interfering signals may include a sum of power parameters for each of the interfering signals.

Accordingly, the RU1 911 may determine to apply the zero-forcing technique as provided in this disclosure based on the comparison of the power parameter of the desired signal and the power parameter for the interfering signals. For example, the RU1 911 may apply the zero-forcing technique when the power parameter of the desired signal is below the power parameter of the interfering signals. The RU1 911 may apply another technique to perform precoding or beam compression (MRC or matched filtering based) to transmit signals to the DU 901 when the power parameter of the desired signal is above the power parameter of the interfering signals.

In this disclosure, this technique may also be referred to as beam compression in which RUs may perform a precoding process by multiplying a matrix (i.e. which is referred to as precoding matrix in this disclosure). However, the skilled person would realize that this is not provided in a restrictive manner and the RUs may apply a further precoding layer (over an existing precoding matrix) with the precoding matrices as provided in this disclosure. In various examples, the processor of the RU may also perform the beam compression with a Discrete Fourier Transform (DFT) matrix, in particular in cases when the channel knowledge is absent, while MRC can be applied if channel information can be identified at the RU.

Furthermore, apart from scheduling and power control, directional beamforming at UEs may also be employed especially in mmWave systems (apart from sub-6 GHz techniques in 5G NR), so that residual weak interference at the DU 901 may be reduced after considering above RU beamforming techniques. This could involve switching beam indices in the cell sector and re-allocation of uplink beams so that a few of the weak interference channels are almost nulled by exploiting directional beamforming of mmWave systems. Joint optimization of mmWave beamforming SNR and interference cancellation based on power and scheduling constraints can be performed to maximize performance.

Furthermore, UEs may select beamforming and/or precoding matrices (according to a predefined codebook or otherwise) so that the weak interference channels are negligible. To this end, either 5G NR beamforming schemes could be reconfigured or techniques such as Interference Alignment can be performed when precise channel state information is available at the UEs.

Accordingly, each UE served by a RU may also participate in the interference reduction technique with a scheme that was provided exemplarily for the downlink configuration in order to reduce interferences for UEs or a group of UEs with a hierarchical application of precoding matrices, i.e. one precoding matrix at the UE and one precoding matrix at the RU that serves the UE.

FIG. 11 shows an example of a radio communication network. The radio communication network 1100 may be depicted as a portion of the radio communication network 900. A DU 1101 may include a transceiver configured to communicate with a plurality of RUs including a first RU 1102 and a second RU 1104. The plurality of RUs (e.g. first RU 1102, the second RU 1104) may be serving a number of UEs, such that each RU of the plurality of RUs (e.g. the first RU 1102, the second RU 1104) may be serving a group of UEs (not shown).

Accordingly, the first RU 1102 may be serving a group of UEs and one UE of the group of UEs may include the UE 1103. The second RU 1104 may also be serving a group of UEs and one UE of the group of UEs may include the UE 1103 as well. Accordingly, both RUs 1102, 1104 may be serving the UE 1103, and the UE 1103 may receive and transmit radio communication signals to the RU 1102 and the second RU 1104 within the radio communication network 1100.

In this illustrative example, the UE 1103 may determine a precoding matrix in order to reduce at least some of the interferences in the radio communication network 1103. The UE 1103 may obtain estimated channel parameters via various methods (e.g. channel estimations performed by the UE 1103, or received channel information), and the UE 1103 may apply a zero-forcing technique as exemplarily provided in this disclosure with an intention to reduce interferences from other UEs or other groups of UEs that are served by other RUs.

For this illustrative example, the UE 1103 may determine a first precoding matrix by applying the zero-forcing technique to reduce interferences from other UEs that are served by the second RU 1104. Accordingly, the UE 1103 may apply the zero-forcing technique based on estimated channel parameters with respect to the other UEs that are served by the second RU 1104.

Similarly, the UE 1103 may determine a second precoding matrix by applying the zero-forcing technique to reduce interferences from other UEs that are served by the first RU 1102. Accordingly, the UE 1103 may apply the zero-forcing technique based on estimated channel parameters with respect to the other UEs that are served by the first RU 1102.

The UE 1103 may precode radio communication signals to be transmitted to the first RU 1102 according to the first precoding matrix, and the UE 1103 may precode radio communication signals to be transmitted to the second RU 1104 according to the second precoding matrix with a desire to reduce at least a portion of interferences that the corresponding radio communications signals may be subjected to.

After the UE 1103 may perform the first precoding with an intention to reduce interference of a portion of the interfering signals, each RU 1102, 1104 may further determine a precoding matrix as provided in this disclosure and apply the corresponding precoding matrix for communication signals to be transmitted to the DU 1101 with an intention to reduce at least a portion of the residual interfering signals. Furthermore, the DU 1101 may perform further interference reduction techniques as exemplarily provided in this disclosure to obtain transmitted symbols.

With respect to the zero-forcing techniques provided in this disclosure a DU or an RU may calculate the null space of the corresponding matrices (e.g. aggregated channel matrices based on selections). Principally, the aggregated channel matrix may include channel matrices to determine precoding matrices with respect to designated channels as provided in this disclosure. There may be cases in which the DU may perform the null space calculation based on only one channel matrix. In such cases, the skilled person would recognize that a generation of an aggregated channel matrix may not be necessary. The operations below will refer to the aggregated channel matrix for exemplary purposes. In various examples, the aggregated channel matrix may include a transpose for each of the channel matrices included in the null space calculation as provided in this disclosure.

In various examples, a processor of a DU, RU, or UE, may block diagonalize an aggregated channel matrix to obtain the null space of the aggregated channel matrix. The processor may be configured to perform a singular value decomposition (SVD) to obtain a diagonal matrix D comprising singular values, a first matrix comprising right singular vectors V, and a second matrix comprising left singular vectors U. For an aggregated channel matrix H obtained according to various examples provided in this disclosure, the processor may decompose the aggregated channel matrix H as, $H = U D V^H$, V denoting the right singular vectors and U denoting the left singular vectors. The processor may obtain the precoding matrix from the null space of H, which would be from right singular vectors V, after SVD. As this is a known technique, this disclosure will not provide the details with respect to a regular decomposition process with SVD. Also, SVD is not applied in a restrictive manner and other decomposition techniques could be used to identify the null space.

In accordance with various aspects of this disclosure, the number of communication signals that are scheduled for transmission between a DU and an RU for the corresponding transmission in uplink or downlink configuration may be denoted with N. The processor may determine a dimension of the null space of the aggregated channel matrix H.

In case the dimension of the null space of the aggregated channel matrix H is smaller than the number N, the processor may order singular values within the diagonal matrix D in an ascending order. Accordingly, the processor may select the first N columns corresponding to nullspace in the ordered diagonal matrix D from the right singular vectors, V to obtain a precoding matrix. This could be performed with respect to the aggregated channel matrix that processor may apply the zero-forcing technique to, and may be formulated as $V_1 = V(:, 1:N)$. In various examples, the number N may refer to the number of data streams to be transmitted to a UE over various RUs as provided exemplarily with respect to FIG. 6.

In case the dimension of the null space of the aggregated channel matrix H is greater than the number N, the processor may apply a selection in order to match the number of links of the fronthaul. The processor may apply the selection based on channel gain parameters in order to maximize the channel gain for the transmission (e.g. for the UE that the communication signals are to be transmitted in uplink configuration). Accordingly, the processor may calculate effective channel gains with the first matrix (e.g. using the channel matrix of the communication channel related to the UE, by a multiplication of $H_{desired}$ V, where $H_{desired}$ is the channel matrix of the RU to transmit radio communication signals to the UE). Then, the processor may order calculated effective channel gains ($H_{desired}$ V) in a descending order and the processor may select the first N columns of the first matrix corresponding to the ordered calculated effective channel gains to obtain a precoding matrix $V_1$ with respect to the aggregated channel matrix that processor may apply the zero-forcing technique to.

As provided in these examples, $V_1$ may refer to an outer precoding matrix (e.g. $2^{nd}$ precoder in FIG. 5) that the DU (or the RU) may determine for the RU for transmission to the UE that the RU is serving. In both cases, the processor may further calculate an inner precoding matrix (e.g. $1^{st}$ precoder in FIG. 5) based on the outer precoding matrix. M denoting the number of communication signals scheduled for transmission at the DU, the processor may determine the inner precoding matrix based on a SVD of an effective channel $H_{desired} V_1 = U^o D^o V^{o,H}$, and selecting M columns from the matrix $V^o$ in a similar manner for the inner precoding matrix, $V_2$ resulting a precoder for the UE as $V = V_1 V_2$.

Figure 12:
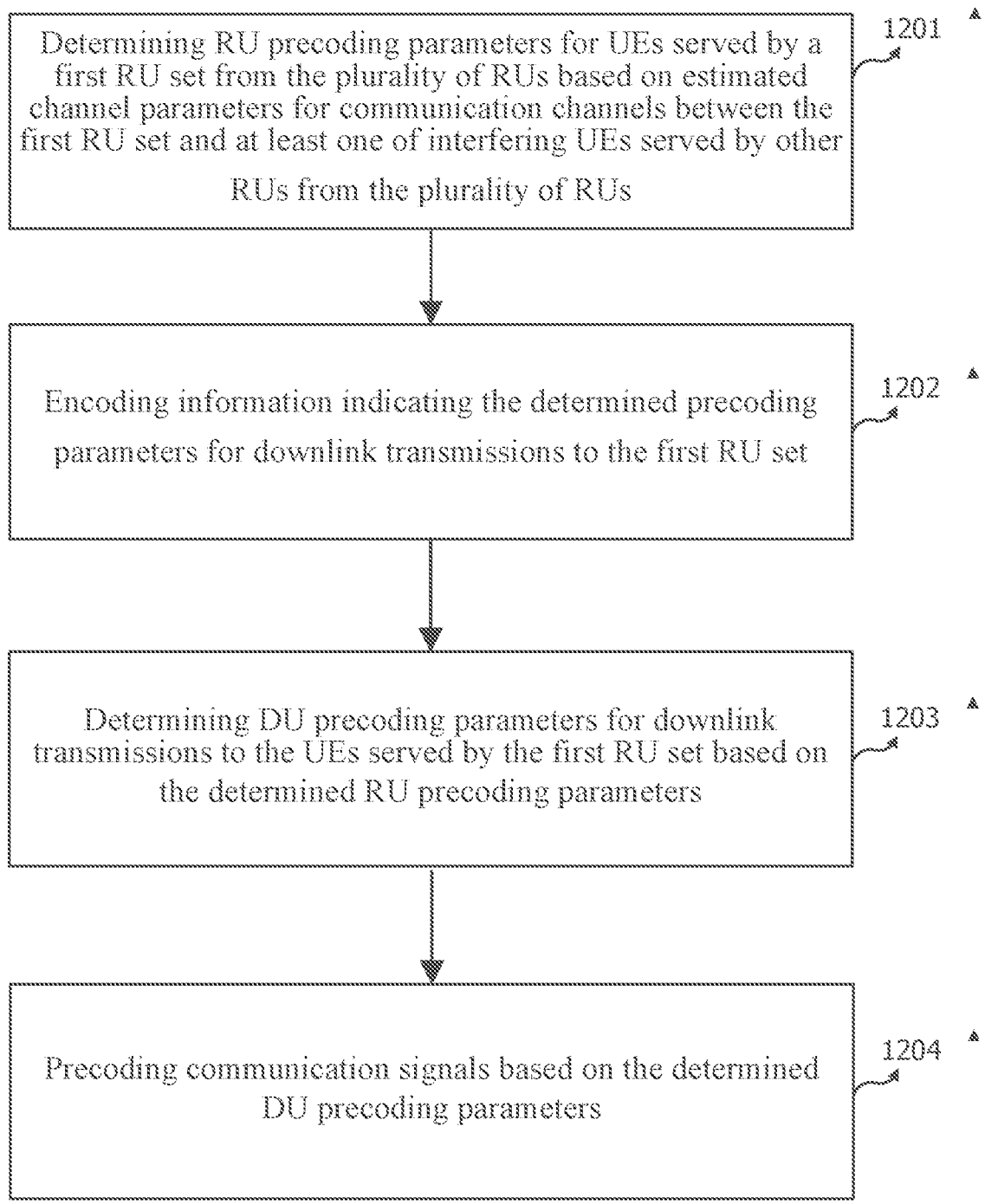
FIG. 12 shows an example of a method.

FIG. 12 shows an example of a method. The method may include determining 1201 RU precoding parameters for UEs served by a first RU set from the plurality of RUs based on estimated channel parameters for communication channels between the first RU set and at least one of interfering UEs served by other RUs from the plurality of RUs, encoding 1202 information indicating the determined precoding parameters for downlink transmissions to the first RU set, determining 1203 DU precoding parameters for downlink transmissions to the UEs served by the first RU set based on the determined RU precoding parameters, and precoding 1204 communication signals based on the determined DU precoding parameters. A non-transitory computer-readable medium may include instructions which, when executed by a processor, cause the processor to perform the method.

Figure 13:
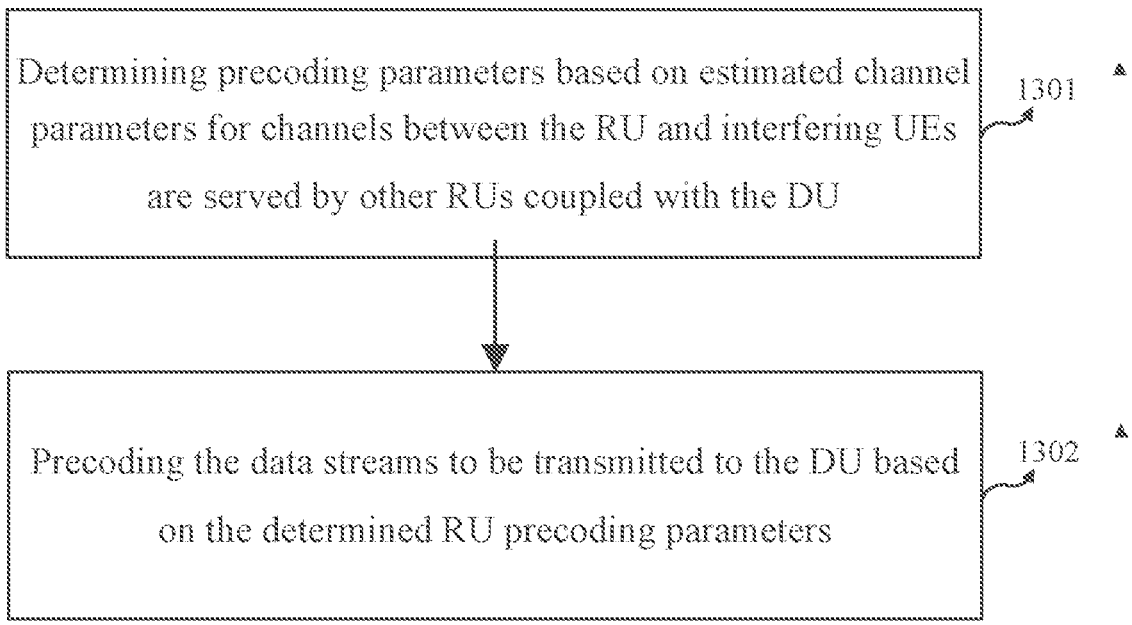
FIG. 13 shows an example of a method.

FIG. 13 shows an example of a method. The method may include determining 1301 precoding parameters based on estimated channel parameters for channels between the RU and interfering UEs are served by other RUs coupled with the DU and precoding 1302 the data streams to be transmitted to the DU based on the determined RU precoding parameters. A non-transitory computer-readable medium may include instructions which, when executed by a processor, cause the processor to perform the method.

The following examples pertain to further aspects of this disclosure.

In example 1, the subject matter includes a radio unit (RU) including: a transceiver configured to receive RU precoding parameters from a DU that the RU is communicatively coupled to; a processor configured to: precode downlink radio communication signals to be transmitted to one of the plurality of UEs based on the received RU precoding parameters; estimate channel parameters based on pilot sequences for communication channels with respect to each of the plurality of UEs, wherein the plurality of UEs includes one or more UEs served by a plurality of other RUs communicatively coupled to the DU.

In example 2, the subject matter of example 1, wherein the RU is further configured to adjust the received RU precoding parameters based on the estimated channel parameters. In example 3, the subject matter of example 1, wherein the processor is further configured to perform uplink channel estimation with at least one of Least-Squares (LS) based channel estimation or Minimum mean-square error (MMSE) based channel estimation or Bayesian inference-based channel estimation.

In example 4, the subject matter may include a distributed unit (DU) including: a transceiver configured to communicate with a plurality of radio units (RUs) that are configured to serve a plurality of user equipments (UEs), and a processor configured to: determine RU precoding parameters for UEs served by a first RU set from the plurality of RUs based on estimated channel parameters for communication channels between the first RU set and at least one of interfering UEs served by other RUs from the plurality of RUs; encode information indicating the determined precoding parameters for downlink transmissions to the first RU set; determine DU precoding parameters for downlink transmissions to the UEs served by the first RU set based on the determined RU precoding parameters; precode communication signals based on the determined DU precoding parameters.

In example 5, the subject matter of example 4, wherein the processor is further configured to perform an uplink channel estimation to obtain the estimated channel parameters; wherein the estimated channel parameters include at least one of channel matrices with real or complex coefficients, codebook indices, and/or other channel statistics. In example 6, the subject matter of any one of examples 4 to 5, wherein the transceiver is further configured to receive information including results of channel estimation from the plurality of RUs; wherein the processor is further configured to obtain the estimated channel parameters based on the received information. In example 7, the subject matter of any one of examples 4 to 6, wherein the processor is further configured to perform uplink channel estimation with at least one of Least-Squares (LS) based channel estimation or Minimum mean-square error (MMSE) based channel estimation or Bayesian inference-based channel estimation.

In example 8, the subject matter of any one of examples 4 to 7, wherein the processor is configured to determine the estimated channel parameters to apply a zero-forcing technique based on the fronthaul limitations. In example 9, the subject matter of example 8, wherein the processor is further configured to determine the RU precoding parameters based on the zero-forcing technique applied to the estimated channel parameters for communication channels between the first RU set and the interfering UEs with respect to the first RU set. In example 10, the subject matter of any one of examples 7 to 9, can optionally include that the processor is further configured to determine the RU precoding parameters based on the estimated channel parameters for communication channels between the first RU set and a group of the UEs served by the first RU set; can optionally include that the group of the UEs are determined based on a channel gain parameter for each of the communication channels between the first RU set and the UEs served by the first RU.

In example 11, the subject matter of any one of examples 7 to 10, can optionally include that the processor is further configured to determine a plurality of RU precoding parameters for the plurality of UEs; can optionally include that each RU precoding parameter for one of the plurality of UEs is determined based on estimated channel parameters between the first RU set and plurality of UEs not served by the first RU set. In example 12, the subject matter of any one of examples 7 to 11, can optionally include that the processor is further configured to aggregate estimated channel parameters that the zero-forcing technique is applied to into an aggregated channel matrix; can optionally include that the aggregation of the estimated channel parameters optionally includes calculating a transpose for each of the estimated channel parameters. In example 13, the subject matter of example 12, can optionally include that the processor is further configured to calculate a null space of the aggregated channel matrix.

In example 14, the subject matter of example 13, can optionally include that the processor is further configured to decompose the null space of aggregated channel matrix based on a singular value decomposition (SVD) to obtain a diagonal matrix D may include singular values, right singular vectors V, and left singular vectors U; can optionally include that the processor is further configured to determine the RU precoding parameters for a first UE of the UEs based on the right singular vectors, V. In example 15, the subject matter of example 14, can optionally include that the processor is further configured to calculate a dimension of the null space of the aggregated channel matrix; can optionally include that the processor is further configured to determine the RU precoding parameters based on the dimension of the null space of the aggregated matrix. In example 16, the subject matter of example 15, can optionally include that the RU precoding parameters includes a number of columns N of the right singular vectors from a matrix V, can optionally include that the number of columns N is based on a number of data streams that the DU is configured to transmit data stream to the RU, in case the dimension of the null space of the aggregated channel matrix is greater than the number of data streams.

In example 17, the subject matter of example 16, can optionally include that the processor is further configured to rearrange the order of the singular values of the diagonal matrix D in an ascending order; can optionally include that the RU precoding parameters includes N right singular vectors from the matrix V corresponding to the rearranged order of the singular values of the diagonal matrix. In example 18, the subject matter of any one of examples 16 or 17, can optionally include that the RU precoding parameters includes a number N right singular vectors, can optionally include that the number of vectors is based on the null space dimensions, in case the dimension of the null space of the aggregated channel matrix is less than the number of data streams. In example 19, the subject matter of example 18, can optionally include that the processor is further configured to determine the DU precoding parameters based on an effective channel matrix may include parameters of a channel matrix of communication channels between the first RU set and UEs served by the first RU set and the RU precoding parameters.

In example 20, the subject matter of example 19, can optionally include that the processor is further configured to decompose the null space of the effective channel matrix based on a singular value decomposition (SVD) to obtain a diagonal matrix D may include singular values, a first matrix of right singular vectors V with a dimension based on a number of antennas of the DU configured to transmit signals to the RU set, and a second matrix of left singular vectors U; can optionally include that the processor is further configured to determine the DU precoding parameters for the first UE based on the first matrix. In example 21, the subject matter of example 20, can optionally include that the DU precoding parameters includes a number of right singular vectors from the first matrix, can optionally include that the number of vectors is based on a number of data streams that the DU is configured to transmit a data stream.

In example 22, the subject matter of any one of examples 18 or 21, can optionally include that the processor is configured to determine the number of data streams that the DU is configured to transmit data stream to the first RU set based on the fronthaul limitations. In example 23, the subject matter of any one of examples 1 to 22, can optionally include that the transceiver is configured to receive information indicating UEs that are served by the plurality of RUs, can optionally include that the processor is optionally configured to encode a precoder index from a codebook to encode the determined precoding parameters for downlink transmission to the first RU set.

In example 24, the subject matter may include a massive multiple-input multiple-output (MIMO) system may include: the DU according to any one of examples 1 to 23; a plurality of RUs may include the first RU set, the first RU set may include: a transceiver configured to receive the RU precoding parameters to be used in downlink transmissions to the first UE; a processor configured to precode downlink radio communication signals for the UEs based on the received RU precoding parameters. In example 25, the subject matter of example 24, can optionally include that the processor of the first RU set is further configured to estimate RU channel parameters for the communication channels between the first RU set and the UEs served by the first RU set. can optionally include that the processor of the first RU set is further configured to encode estimated RU channel parameters for downlink transmission from the DU. In example 26, the subject matter of any one of examples 27 or 28, can optionally include that the processor is configured to determine RU precoding parameters for the first UE based on received estimated channel parameters; can optionally include that the processor is further configured to determine the RU precoding parameters based on a zero-forcing technique applied to the received estimated channel parameters for communication channels between the first RU set and the UEs served by the first RU set.

In example 27, the subject matter may include a non-transitory computer-readable medium that may include instructions which, if executed by a processor, cause the processor to: determine RU precoding parameters for UEs served by a first RU set from a plurality of RUs based on estimated channel parameters for communication channels between the first RU set and at least one of interfering UEs served by other RUs from the plurality of RUs; encode information indicating the determined precoding parameters for downlink transmissions to the first RU set; determine DU precoding parameters for downlink transmissions to the UEs served by the first RU set based on the determined RU precoding parameters; precode communication signals based on the determined DU precoding parameters.

In example 28, the subject matter may include a method that may include: determining RU precoding parameters for UEs served by a first RU set from the plurality of RUs based on estimated channel parameters for communication channels between the first RU set and at least one of interfering UEs served by other RUs from the plurality of RUs; encoding information indicating the determined precoding parameters for downlink transmissions to the first RU set; determining DU precoding parameters for downlink transmissions to the UEs served by the first RU set based on the determined RU precoding parameters; precoding communication signals based on the determined DU precoding parameters.

In example 29, the subject matter may include a radio unit (RU) that may include: a transceiver configured to receive uplink radio communication signals from a plurality of user equipments (UEs) and transmit data streams to a distributed unit (DU) based on received uplink radio communication signals; a processor configured to: determine precoding parameters based on estimated channel parameters for communication channels between the RU and interfering UEs served by other RUs coupled with the DU; precode the data streams to be transmitted to the DU based on the determined RU precoding parameters.

In example 30, the subject matter of example 29, can optionally include that the processor is configured to determine the precoding parameters based on a set of the estimated channel parameters; can optionally include that the estimated channel parameters include at least one of channel matrices with real or complex coefficients, codebook indices and/or other channel statistics. In example 31, the subject matter of example 30, can optionally include that the processor is further configured to select the estimated channel parameters based on pilot sequences such as Zadoff-Chu sequences, estimated using Least Squares (LS), Minimum Mean Square Error (MMSE) or Bayesian inference based Channel estimation. In example 32, the subject matter of example 30 or example 31, can optionally include that the processor is further configured to select the estimated channel parameters based on quality of service (QoS) parameters with respect to one or more groups of the plurality of UEs.

In example 33, the subject matter of any one of examples 30 to 32, can optionally include that the processor is further configured to select the estimated channel parameters based on positions of the UEs relative to the RU, or relative to the respective group of the plurality of UEs. In example 34, the subject matter of any one of examples 30 to 33, can optionally include that the processor is further configured to select the estimated channel parameters based on a parameter representing the fairness of the communication network. In example 35, the subject matter of any one of examples 30 to 34, can optionally include that the processor is further configured to select the estimated channel parameters based on availability of measurement results. In example 36, the subject matter of any one of examples 30 to 35, can optionally include that the processor is further configured to determine a number of groups to include in the set of estimated channel parameters based on the fronthaul limitation; can optionally include that the set of estimated channel parameters includes the estimated channel parameters for the determined number of the interfering UEs.

In example 37, the subject matter of any one of examples 30 to 36, can optionally include that the processor is further configured to determine the RU precoding parameters based on a zero-forcing technique applied using the estimated channel parameters. In example 38, the subject matter of example 37, can optionally include that the processor is further configured to operate in a first operation mode in which the processor applies the zero-forcing technique using signals received from one or more of the interfering UEs; can optionally include that the processor is further configured to operate in a second operation mode in which the processor performs maximum ratio combining to forward data streams to the DU based on signals received from the plurality of UEs. In example 39, the subject matter of example 38, can optionally include that the processor is configured to switch between the first operation mode and the second operation mode based on a comparison of the signal power metrics between signals received from the plurality of UEs and the interfering UEs; can optionally include that the processor is further configured to determine the signal power metrics using the norm of the estimated channel matrices; can optionally include that the processor is further configured to select a subset of the interfering UEs in the comparison with served UEs by thresholding the signal power metrics.

In example 40, the subject matter of example 39, can optionally include that each estimated channel parameter of the set of estimated channel parameters includes a channel matrix; can optionally include that the processor is configured to obtain an aggregated channel matrix including the channel matrices; can optionally include that the processor is further configured to calculate a transpose to a combination of the channel matrices to obtain the aggregated channel matrix. In example 41, the subject matter of example any one of examples 38 to 40, can optionally include that the estimated channel parameters includes channel matrices; can optionally include that the processor is further configured to sort the norms of the channel matrices; can optionally include that the processor is further configured select a predefined number of channel matrices based on the order of the norms; can optionally include that the processor is further configured to aggregate the selected channel matrices into an aggregated channel matrix, can optionally include that the processor is further configured to calculate a transpose to a combination of the selected channel matrices to obtain the aggregated channel matrix.

In example 42, the subject matter of any one of examples 40 or 41, can optionally include that the processor is further configured to calculate a null space of the aggregated channel matrix; can optionally include that the processor is further configured to determine the RU precoding parameters based on a plurality of vectors corresponding to the null space of the aggregated channel matrix. In example 43, the subject matter of example 42, can optionally include that the processor is further configured to decompose the nullspace of the aggregated channel matrix based on a singular value decomposition (SVD) to obtain a diagonal matrix D may include singular values, a right singular vectors V, and a left singular vectors U; can optionally include that the processor is further configured to determine the RU precoding parameters based on the right singular vectors V. In example 44, the subject matter of any one of examples 34 to 43, can optionally include that the processor is configured to define the predefined number based on number of data streams to transmit to the DU. In example 45, the subject matter of any one of examples 34 to 44, can optionally include that the processor is configured to precode the data streams to be transmitted to the distributed unit based on the determined precoding parameters in an uplink configuration.

In example 46, A non-transitory computer-readable medium may include instructions which, if executed by a processor, cause the processor to: determine precoding parameters based on estimated channel parameters for channels between the RU and interfering UEs are served by other RUs coupled with the DU; precode the data streams to be transmitted to the DU based on the determined RU precoding parameters.

In example 47, the subject matter may include a method may include: determining precoding parameters based on estimated channel parameters for channels between the RU and interfering UEs are served by other RUs coupled with the DU; precoding the data streams to be transmitted to the DU based on the determined RU precoding parameters.

In example 48, the subject matter may include a distributed unit (DU) that may include: a transceiver configured to receive data streams from a plurality of radio units (RUs), each one of the received data streams from one of the RUs is precoded based on estimated channel parameters for a first set of communication channels between at least one selected RU of the plurality of RUs and a first plurality of user equipments (UEs); a circuit configured to reduce residual interference corresponding to a second set of communication channels between a selected RU set from the plurality of RUs and a second plurality of UEs that are not served by the selected RU set.

In example 49, the subject matter of any one of examples 46 to 48, can optionally include that the circuit includes a whitening filter or a minimum mean square error-interference rejection combining circuit to reduce residual interference. In example 50, the subject matter of example 49, further may include a processor configured to reduce residual interference by changing a scheduling parameter or a power level parameter for the at least one of the second plurality of UEs corresponding to the second set of communication channels. In example 51, the subject matter of example 49 or example 50, can optionally include that the processor is further configured to determine a beam allocation to reduce the residual interference from the second plurality of UEs corresponding to the second set of communication channels; can optionally include that the residual interference is reduced using information indicating at least one of a switching of beam indices or re-allocation of uplink beams.

In example 52, the subject matter may include a non-transitory computer-readable medium may include instructions which, if executed by a processor, cause the processor to: perform a beam management operation to receive data streams from a plurality of radio units (RUs), each one of the received data streams from one of the RUs is precoded based on estimated channel parameters for a first set of communication channels between at least one selected RU of the plurality of RUs and a first plurality of user equipments (UEs); control a circuit to reduce the residual interference at a second set of communication channels between at least one other RU of the plurality of RUs and a plurality of interfering UEs.

In example 53, the subject matter may include a method may include: receiving data streams from a plurality of radio units (RUs), each one of the received data streams from one of the RUs is precoded based on estimated channel parameters for a first set of communication channels between at least one selected RU of the plurality of RUs and a first plurality of user equipments (UEs); reducing residual interference corresponding to a second set of communication channels between a selected RU set from the plurality of RUs and a second plurality of UEs that are not served by the selected RU set.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "precode" as used herein may be understood to multiply communication signals (including radio communication signal) to be transmitted by an entity with a precoding matrix including appropriate weights with an appropriate dimensions with an intention to match number of transmission and reception links and maximize power of the signal at a receiver.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

The term "RU set", as used herein may refer to one RU, or may refer to more RUs. The term "serve", as used herein may define a scenario in which an entity provide various services (e.g. RUs providing services of with respect to PHY layer and RF functions) especially with respect to radio communication network. It may include the cases where two entities are communicatively coupled to and providing services to each other.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11 ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A distributed unit (DU) comprising:
a transceiver configured to communicate with a plurality of radio units (RUs) that are configured to serve a plurality of user equipments (UEs), and
a processor configured to:
determine RU precoding parameters for UEs served by a first RU set from the plurality of RUs based on estimated channel parameters representing communication channels between the first RU set and at least one of interfering UEs served by other RUs from the plurality of RUs, wherein the other RUs are distinct from RUs within the first RU set;
encode information indicating the determined RU precoding parameters for application to downlink transmissions to the first RU set;
determine DU precoding parameters for precoding, at the DU, communication signals intended for downlink transmissions via the first RU set to the UEs served by the first RU set based on the determined RU precoding parameters; and
precode the communication signals at the DU based on the determined DU precoding parameters prior to transmission towards the first RU set.

2. The distributed unit (DU) of claim 1,
wherein the processor is further configured to perform uplink channel estimation with at least one of Least-Squares (LS) based channel estimation or Minimum mean-square error (MMSE) based channel estimation or Bayesian inference-based channel estimation.

3. The distributed unit (DU) of claim 1,
wherein the processor is configured to determine the estimated channel parameters to apply a zero-forcing technique based on the fronthaul limitations.

4. The distributed unit (DU) of claim 3,
wherein the processor is further configured to determine the RU precoding parameters based on the zero-forcing technique applied to the estimated channel parameters for communication channels between the first RU set and the interfering UEs with respect to the first RU set.

5. The distributed unit (DU) of claim 3,
wherein the processor is further configured to determine the RU precoding parameters based on the estimated channel parameters for communication channels between the first RU set and a group of the UEs served by the first RU set;
wherein the group of the UEs are determined based on a channel gain parameter for each of the communication channels between the first RU set and the UEs served by the first RU.

6. The distributed unit (DU) of claim 3,
wherein the processor is further configured to determine a plurality of RU precoding parameters for the plurality of UEs;
wherein each RU precoding parameter for one of the plurality of UEs is determined based on estimated channel parameters between the first RU set and plurality of UEs not served by the first RU set.

7. The distributed unit (DU) of claim 3,
wherein the processor is further configured to aggregate estimated channel parameters that the zero-forcing technique is applied to into an aggregated channel matrix;
wherein the processor is further configured to calculate a null space of the aggregated channel matrix;
wherein the processor is further configured to decompose the null space of aggregated channel matrix based on a singular value decomposition (SVD) to obtain a diagonal matrix D comprising singular values, right singular vectors V, and left singular vectors U;
wherein the processor is further configured to determine the RU precoding parameters for a first UE of the UEs based on the right singular vectors, V.

8. The distributed unit (DU) of claim 7,
wherein the RU precoding parameters comprises a number of columns N of the right singular vectors from a matrix V, wherein the number of columns N is based on a number of data streams that the DU is configured to transmit data stream to the RU, in case the dimension of the null space of the aggregated channel matrix is greater than the number of data streams;
wherein the processor is further configured to rearrange the order of the singular values of the diagonal matrix D in an ascending order;
wherein the RU precoding parameters comprises N right singular vectors from the matrix V corresponding to the rearranged order of the singular values of the diagonal matrix.

9. The distributed unit (DU) of claim 8,
wherein the RU precoding parameters comprises a number N right singular vectors, wherein the number of vectors is based on the nullspace dimensions, in case the dimension of the null space of the aggregated channel matrix is less than the number of data streams.

10. The distributed unit (DU) of claim 9,
wherein the processor is further configured to determine the DU precoding parameters based on an effective channel matrix comprising parameters of a channel matrix of communication channels between the first RU set and UEs served by the first RU set and the RU precoding parameters;
wherein the processor is further configured to decompose the nullspace of the effective channel matrix based on a singular value decomposition (SVD) to obtain a diagonal matrix D comprising singular values, a first matrix of right singular vectors V with a dimension based on a number of antennas of the DU configured to transmit signals to the RU set, and a second matrix of left singular vectors U;
wherein the processor is further configured to determine the DU precoding parameters for the first UE based on the first matrix;
wherein the DU precoding parameters comprises a number of right singular vectors from the first matrix, wherein the number of vectors is based on a number of data streams that the DU is configured to transmit a data stream.

11. A radio unit (RU) comprising:
a transceiver configured to receive uplink radio communication signals from a plurality of user equipments (UEs) and transmit data streams to a distributed unit (DU) based on received uplink radio communication signals; and a processor configured to:
  determine precoding parameters based on estimated channel parameters for communication channels between the RU and interfering UEs served by other RUs coupled with the DU, wherein the estimated channel parameters are selected based on at least one of quality of service (QOS) parameters with respect to one or more groups of the plurality of UEs, positions of the UEs relative to the RU, or positions of the UEs relative to the respective group of the plurality of UEs, a parameter representing the fairness of the communication network, or availability of measurement results; and
  precode the data streams to be transmitted to the DU based on the determined RU precoding parameters.

12. The radio unit (RU) of claim 11,
wherein the processor is further configured to obtain an aggregated channel matrix based on the selection of the estimated channel parameters.

13. The radio unit (RU) of claim 12,
wherein the processor is further configured to determine a number of groups to include in the estimated channel parameters based on the fronthaul limitation;
wherein the estimated channel parameters comprises the estimated channel parameters for the determined number of the interfering UEs;
wherein the processor is further configured to determine the RU precoding parameters based on a zero-forcing technique applied using the estimated channel parameters.

14. The radio unit (RU) of claim 13,
wherein the processor is further configured to operate in a first operation mode in which the processor applies the zero-forcing technique using signals received from one or more of the interfering UEs;
wherein the processor is further configured to operate in a second operation mode in which the processor performs maximum ratio combining to forward data streams to the DU based on signals received from the plurality of UEs.

15. The radio unit (RU) of claim 14,
wherein the processor is configured to switch between the first operation mode and the second operation mode based on a comparison of signal power metrics between signals received from the plurality of UEs and the interfering UEs;
wherein the processor is further configured to determine the signal power metrics using the norm of the estimated channel matrices;
wherein the processor is further configured to select a subset of the interfering UEs in the comparison with served UEs by thresholding the signal power metrics.

16. The radio unit (RU) of claim 15,
wherein the estimated channel parameters comprises channel matrices;
wherein the processor is further configured to sort the norms of the channel matrices;
wherein the processor is further configured select a predefined number of channel matrices based on the order of the norms;
wherein the processor is further configured to aggregate the selected channel matrices into an aggregated channel matrix,
wherein the processor is further configured to calculate a transpose to a combination of the selected channel matrices to obtain the aggregated channel matrix.

17. The radio unit (RU) of claim 16,
wherein the processor is further configured to calculate a null space of the aggregated channel matrix;
wherein the processor is further configured to determine the RU precoding parameters based on a plurality of vectors corresponding to the null space of the aggregated channel matrix;
wherein the processor is further configured to decompose the nullspace of the aggregated channel matrix based on a singular value decomposition (SVD) to obtain a diagonal matrix D comprising singular values, a right singular vectors V, and a left singular vectors U;
wherein the processor is further configured to determine the RU precoding parameters based on the right singular vectors V.

18. The radio unit (RU) of claim 17,
wherein the processor is configured to define the predefined number based on number of data streams to transmit to the DU.

19. A distributed unit (DU) comprising:
a transceiver configured to receive data streams from a plurality of radio units (RUs), wherein each one of the received data streams from one of the RUs is precoded based on estimated channel parameters for a first set of communication channels between at least one selected RU of the plurality of RUs and a first plurality of user equipments (UEs); and
a processor configured to reduce residual interference corresponding to a second set of communication channels between a selected RU set from the plurality of RUs and a second plurality of UEs that are not served by the selected RU set, wherein the processor is configured to reduce the residual interference by at least one of: changing a scheduling parameter or a power level parameter for at least one UE of the second plurality of UEs; or determining a beam allocation to reduce the residual interference from the second plurality of UEs, wherein the beam allocation comprises at least one of switching of beam indices or re-allocation of uplink beams.

* * * * *